(12) United States Patent
Yamazaki et al.

(10) Patent No.: US 12,334,507 B2
(45) Date of Patent: Jun. 17, 2025

(54) SOLID-STATE SECONDARY BATTERY

(71) Applicant: SEMICONDUCTOR ENERGY LABORATORY CO., LTD., Atsugi (JP)

(72) Inventors: Shunpei Yamazaki, Tokyo (JP); Kazutaka Kuriki, Kanagawa (JP); Yumiko Yoneda, Kanagawa (JP); Ryota Tajima, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 673 days.

(21) Appl. No.: 17/606,839

(22) PCT Filed: Apr. 17, 2020

(86) PCT No.: PCT/IB2020/053637
§ 371 (c)(1),
(2) Date: Oct. 27, 2021

(87) PCT Pub. No.: WO2020/222067
PCT Pub. Date: Nov. 5, 2020

(65) Prior Publication Data
US 2022/0216524 A1    Jul. 7, 2022

(30) Foreign Application Priority Data
Apr. 30, 2019   (JP) .................. 2019-087101

(51) Int. Cl.
*H01M 10/0562* (2010.01)
*H01M 4/13* (2010.01)
(Continued)

(52) U.S. Cl.
CPC ......... *H01M 10/0585* (2013.01); *H01M 4/13* (2013.01); *H01M 4/483* (2013.01);
(Continued)

(58) Field of Classification Search
CPC ......... H01M 10/0562; H01M 10/0565; H01M 2300/0065; H01M 2300/0068;
(Continued)

(56) References Cited

U.S. PATENT DOCUMENTS 8,404,001 B2    3/2013   Kuriki
8,945,766 B2    2/2015   Yoshida et al.
(Continued)

FOREIGN PATENT DOCUMENTS

CN    108604676 A    9/2018
JP    2001-076710 A    3/2001
(Continued)

OTHER PUBLICATIONS

International Search Report (Application No. PCT/IB2020/053637) Dated Jul. 7, 2020.
(Continued)

*Primary Examiner* — Jeremiah R Smith
(74) *Attorney, Agent, or Firm* — Fish & Richardson P.C.

(57) ABSTRACT

A solid-state secondary battery with high safety is provided. The solid-state secondary battery includes a first film that has a function of releasing and accumulating a lithium ion and is over a negative electrode current collector layer, a second film that has a function of transporting a lithium ion and is over the first film, a third film that has a function of releasing and accumulating a lithium ion and is over the second film, and a positive electrode current collector layer over the third film. The total thickness of the first to third films is the same before and after charging.

13 Claims, 16 Drawing Sheets

(51) Int. Cl.
*H01M 4/48* (2010.01)
*H01M 10/0525* (2010.01)
*H01M 10/0585* (2010.01)
*H01M 4/02* (2006.01)

(52) U.S. Cl.
CPC ... *H01M 10/0525* (2013.01); *H01M 10/0562* (2013.01); *H01M 2004/021* (2013.01); *H01M 2300/0071* (2013.01)

(58) Field of Classification Search
CPC ..... H01M 2300/0082; H01M 10/0585; H01M 10/052; H01M 10/0525
See application file for complete search history.

(56) References Cited

U.S. PATENT DOCUMENTS

| | | | |
|---|---|---|---|
| 9,109,286 B2 | 8/2015 | Yamazaki et al. | |
| 9,646,771 B2 | 5/2017 | Kuriki et al. | |
| 10,326,165 B2 | 6/2019 | Young et al. | |
| 10,511,053 B2 | 12/2019 | Fujinoki et al. | |
| 11,050,057 B2 | 6/2021 | Kaga et al. | |
| 2003/0087154 A1* | 5/2003 | Ohzuku | H01M 4/505 429/223 |
| 2005/0118502 A1 | 6/2005 | Honda et al. | |
| 2005/0118504 A1 | 6/2005 | Honda et al. | |
| 2007/0111101 A1* | 5/2007 | Ohkubo | H01M 4/583 429/232 |
| 2009/0229700 A1* | 9/2009 | Kanamura | H01M 10/058 141/1.1 |
| 2010/0143583 A1 | 6/2010 | Honda et al. | |
| 2010/0261067 A1* | 10/2010 | Pitts | H01M 4/13 29/623.5 |
| 2015/0171465 A1* | 6/2015 | Chao | C04B 35/6261 429/322 |
| 2017/0033418 A1* | 2/2017 | Suzuki | H01M 10/0525 |
| 2017/0279154 A1 | 9/2017 | Young et al. | |
| 2018/0102567 A1 | 4/2018 | Fujinoki et al. | |
| 2018/0366728 A1 | 12/2018 | Kaga et al. | |
| 2021/0083320 A1* | 3/2021 | Wachsman | H01M 4/382 |
| 2021/0265654 A1* | 8/2021 | Vereecken | H01M 10/0565 |

FOREIGN PATENT DOCUMENTS

| | | |
|---|---|---|
| JP | 2005-183366 A | 7/2005 |
| JP | 2010-245024 A | 10/2010 |
| JP | 4850405 | 1/2012 |
| JP | 2014-029791 A | 2/2014 |
| WO | WO-2017/145894 | 8/2017 |

OTHER PUBLICATIONS

Written Opinion (Application No. PCT/IB2020/053637) Dated Jul. 7, 2020.

* cited by examiner

SOLID-STATE SECONDARY BATTERY

CROSS REFERENCE TO RELATED APPLICATIONS

This application is a U.S. National Phase Application under 35 U.S.C. § 371 of International Application PCT/IB2020/053637, filed on Apr. 17, 2020, which is incorporated by reference and claims the benefit of a foreign priority application filed in Japan on Apr. 30, 2019, as Application No. 2019-087101.

TECHNICAL FIELD

One embodiment of the present invention relates to an object, a method, or a manufacturing method. Alternatively, the present invention relates to a process, a machine, manufacture, or a composition (composition of matter). One embodiment of the present invention relates to a semiconductor device, a display device, a light-emitting device, a power storage device, a lighting device, an electronic device, or a manufacturing method thereof.

Note that electronic devices in this specification generally mean devices including power storage devices, and electro-optical devices including power storage devices, information terminal devices including power storage devices, and the like are all electronic devices.

BACKGROUND ART

Electronic devices carried around by the users and electronic devices worn by the users have been actively developed.

Electronic devices carried around by users and electronic devices worn by users operate using primary batteries or secondary batteries, which are examples of a power storage device, as power sources. The electronic devices carried around by users need to withstand the use for a long period, and high-capacity secondary batteries are used. However, there is a problem in that high-capacity secondary batteries are large and have a heavy weight. In view of the problem, development of small or thin high-capacity secondary batteries that can be incorporated in portable electronic devices is being pursued.

A lithium ion secondary battery using an electrolyte solution such as an organic solvent as a transmission medium of lithium ions serving as carrier ions is widely used. However, a secondary battery using liquid has problems such as the operable temperature range, decomposition reaction of an electrolyte solution by a potential to be used, and liquid leakage to the outside of the secondary battery since the secondary battery uses liquid. In addition, a secondary battery using an electrolyte solution has a risk of ignition due to liquid leakage.

A fuel battery is a secondary battery using no liquid; however, noble metals are used for the electrodes, and a material of a solid electrolyte is also expensive.

In addition, as a secondary battery using no liquid, a power storage device using a solid electrolyte, which is called a solid battery, is known. For example, Patent Document 1 is disclosed. Furthermore, Patent Document 2 describes that a resin is used as an electrolyte in a lithium ion secondary battery.

REFERENCE

Patent Document

[Patent Document 1] U.S. Pat. No. 8,404,001 [Patent Document 2] Japanese Published Patent Application No. 2010-245024

SUMMARY OF THE INVENTION

Problems to be Solved by the Invention

One embodiment of the present invention provides a novel all-solid-state secondary battery having a higher level of safety than a conventional lithium-ion secondary battery using an electrolyte solution, specifically, a thin-film-type solid-state secondary battery (also referred to as a thin-film all-solid-state battery), is provided. An object of one embodiment of the present invention is to provide a novel power storage device.

Note that the description of these objects does not preclude the existence of other objects. One embodiment of the present invention does not have to achieve all these objects. Other objects can be derived from the description of the specification, the drawings, and the claims.

Means for Solving the Problems

One embodiment of the present invention is a solid-state secondary battery including a first film that has a function of releasing and accumulating a lithium ion, a second film that has a function of transporting a lithium ion and is over the first film, and a third film that has a function of releasing and accumulating a lithium ion and is over the second film. The first film expands and the third film contracts while the total thickness of the first to third films is maintained in a charge period.

Another embodiment of the present invention is a solid-state secondary battery including a first film that has a function of releasing and accumulating a lithium ion and is over a positive electrode current collector layer, a second film that has a function of transporting a lithium ion and is over the first film, a third film that has a function of releasing and accumulating a lithium ion and is over the second film, and a negative electrode current collector over the third film, in which the total thickness of the first to third films is the same before and after charging.

Another embodiment of the present invention is a solid-state secondary battery including a first film that has a function of releasing and accumulating a lithium ion and is over a positive electrode current collector layer, a second film that has a function of transporting a lithium ion and is over the first film, a third film that has a function of releasing and accumulating a lithium ion and is over the second film, and a negative electrode current collector layer over the third film, in which the thickness between the positive electrode current collector layer and the negative electrode current collector layer is the same before and after charging.

In the above structure, it is preferable that the first film contract and the third film expand in charging.

In the above structure, the second film preferably contains silicon and oxygen.

In the above structure, it is preferable that each of the second film and the third film contain silicon and oxygen and that the mixture ratio of oxygen to silicon in the third film be lower than the mixture ratio of oxygen to silicon in the second film.

In the above structure, the density of the second film is preferably lower than the density of the first film and the density of the third film.

In the above structure, the thickness is preferably an average value of a thickness of a region sandwiched between the negative electrode current collector layer and the positive electrode current collector layer.

Another embodiment of the present invention is a solid-state secondary battery including a first film that has a function of releasing and accumulating a lithium ion and is over a positive electrode current collector layer, a second film that has a function of transporting a lithium ion and is over the first film, a third film that has a function of releasing and accumulating a lithium ion and is over the second film, and a negative electrode current collector layer over the third film. Each of the second film and the third film contains silicon and oxygen. The mixture ratio of oxygen to silicon in the third film is lower than the mixture ratio of oxygen to silicon in the second film. The density of the second film is lower than the density of the first film and the density of the third film. Due to charging, the first film contracts and the third film expands.

Effect of the Invention

According to one embodiment of the present invention, a novel all solid-state secondary battery with high safety, specifically, a thin solid-state secondary battery can be provided. According to one embodiment of the present invention, a novel power storage device can be provided.

In the thin-film-type solid-state secondary battery, an increase in the number of sets of stacked layers each of which includes a positive electrode active material layer, a solid electrolyte layer, and a negative electrode active material layer can lead to multilayer stacking in series or parallel connection and an increase in voltage or capacity.

The capacity of the thin-film-type solid-state secondary battery can also be made higher by an increase in the area.

Furthermore, by a separation transfer technology, bending into a desired size can be performed after the area is increased.

MODE FOR CARRYING OUT THE INVENTION

Embodiments of the present invention are described below in detail with reference to the drawings. Note that the present invention is not limited to the following description, and it is readily understood by those skilled in the art that modes and details of the present invention can be modified in various ways. In addition, the present invention should not be construed as being limited to the description of embodiments below.

Embodiment 1

A solid-state secondary battery of one embodiment of the present invention will be described with reference to FIG. 1, FIG. 2A, and FIG. 2B. Note that in this specification, a single-layer cell of a solid-state secondary battery refers to one unit including at least a positive electrode current collector, a positive electrode active material layer, a solid electrolyte layer, a negative electrode active material layer, and a negative electrode current collector layer.

In addition, in this specification and the like, charging refers to transfer of lithium ions from a positive electrode to a negative electrode in a battery and transfer of electrons from a positive electrode to a negative electrode in an external circuit. Charging of a positive electrode active material refers to extraction of lithium ions, and charging of a negative electrode active material refers to insertion of lithium ions.

Structure Example 1 of Solid-State Secondary Battery

Figure 1:
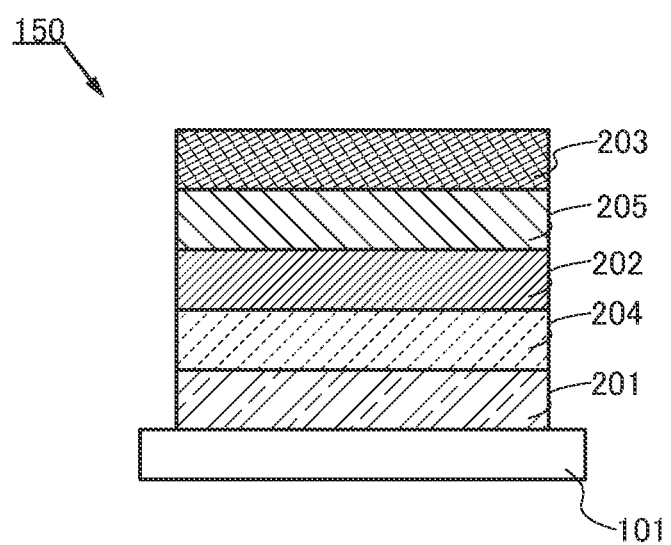
FIG. 1 is a cross-sectional view illustrating one embodiment of the present invention.

In a single-layer cell 150 illustrated in FIG. 1, a positive electrode current collector layer 201, a positive electrode active material layer 204, a solid electrolyte layer 202, a negative electrode active material layer 205, and a negative electrode current collector layer 203 are stacked in this order over a substrate 101. Note that the stacking order may be reversed. That is, the negative electrode current collector layer 203, the negative electrode active material layer 205, the solid electrolyte layer 202, the positive electrode active material layer 204, and the positive electrode current collector layer 201 may be stacked in this order over the substrate 101.

Examples of the substrate 101 include a ceramic substrate, a glass substrate, a plastic substrate, a silicon substrate, and a metal substrate.

As materials of the positive electrode current collector layer 201 and the negative electrode current collector layer 203, one or more kinds of conductive materials selected from Al, Ti, Cu, Au, Cr, W, Mo, Ni, Ag, and the like are used. As a deposition method, a sputtering method, an evaporation method, or the like can be used. In a sputtering method, with the use of a metal mask, deposition can be selectively performed. A conductive film may be patterned by being selectively removed by dry etching or wet etching using a resist mask or the like.

The positive electrode active material layer 204 can be deposited by a sputtering method using a sputtering target including a lithium cobalt oxide ($LiCoO_2$, $LiCo_2O_4$, or the like) as its main component, a sputtering target including a lithium manganese oxide ($LiMnO_2$, $LiMn_2O_4$, or the like) as its main component, or a lithium nickel oxide ($LiNiO_2$, $LiNi_2O_4$, or the like). A lithium manganese cobalt oxide ($LiMnCoO_4$, $Li_2MnCoO_4$, or the like), a ternary material of nickel-cobalt-manganese ($LiNi_{1/3}Mn_{1/3}Co_{1/3}O_2$:NCM), a ternary material of nickel-cobalt-aluminum ($LiNi_{0.8}Co_{0.15}Al_{0.05}O_2$:NCA), or the like can be used. In the above-described material, lithium ions are extracted in charging and lithium ions are accumulated in discharging.

The negative electrode active material layer 205 can be a film containing silicon as a main component, a film containing carbon as a main component, a titanium oxide film, a vanadium oxide film, an indium oxide film, a zinc oxide film, a tin oxide film, a nickel oxide film, or the like which is formed by a sputtering method or the like. A film of tin, gallium, aluminum, or the like which is alloyed with Li can be used. Alternatively, a metal oxide film of any of these which are alloyed with Li may be used. A Li metal film may also be used as the negative electrode active material layer 205. A lithium titanium oxide ($Li_4Ti_5O_{12}$, $LiTi_2O_4$, or the like) may be used; in particular, a film containing silicon and oxygen is preferable. In the above-described materials, lithium ions are accumulated in charging and lithium ions are extracted in discharging.

Since lithium ions are extracted from the positive electrode active material layer 204 in charging as described above, the thickness of the positive electrode active material layer 204 is reduced in some cases. Since lithium ions are accumulated in the negative electrode active material layer 205 in charging, the thickness of the negative electrode active material layer 205 is increased in some cases. Accordingly, before and after charging, the total thickness of the negative electrode active material layer 205, the solid electrolyte layer 202, and the positive electrode active material layer 204 is changed in some cases. In the case where the increase in thickness of the negative electrode active material layer 205 is larger than the decrease in thickness of the positive electrode active material layer 204, the thickness of the single-layer cell 150 is increased by charging. The increase in thickness of the single-layer cell 150 might deform or crack a battery; as a result, characteristics of the battery, in particular, cycle characteristics might become worse.

Here, the present inventors found that the thickness of the single-layer cell 150 can be maintained in charging by adjusting materials and thicknesses of the positive electrode active material and the negative electrode active material.

Figure 2A:
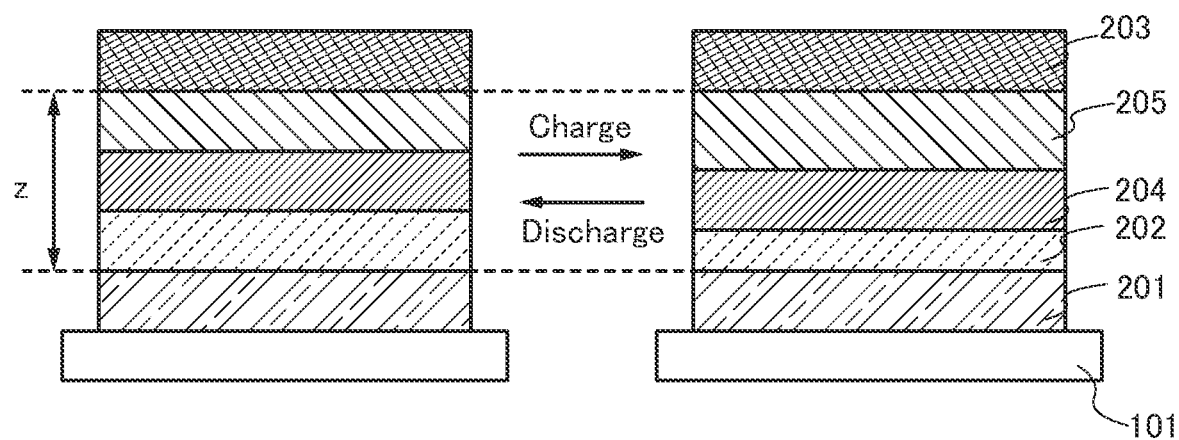
FIG. 2A and FIG. 2B are cross-sectional views illustrating one embodiment of the present invention.
Figure 2B:
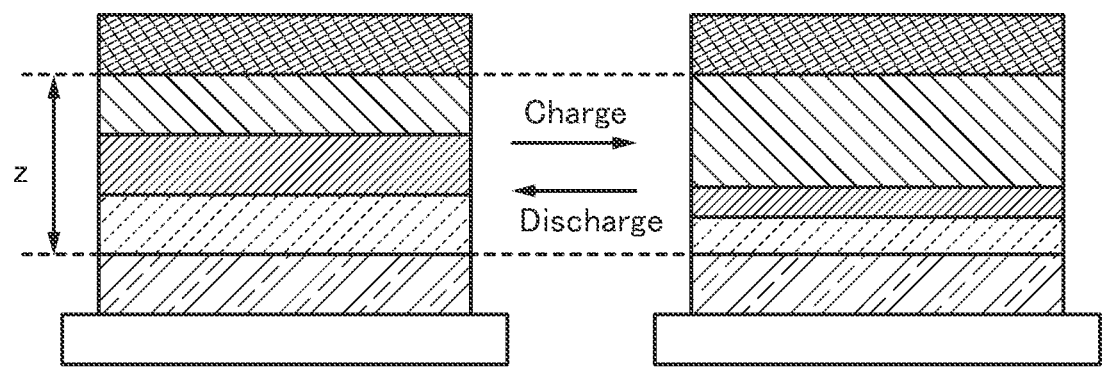

FIG. 2A illustrates that the decrease in thickness of the positive electrode active material layer due to charging and the increase in thickness of the negative electrode active material layer due to charging are made equal to each other, whereby the total thickness z of the positive electrode active material layer 204, the solid electrolyte layer 202, and the negative electrode active material layer 205 is maintained in charging and discharging and before and after the charging and the discharging. That is, in the solid-state secondary battery of one embodiment of the present invention, the thickness between the positive electrode current collector and the negative electrode current collector layer is the same before and after the charging. In that case, the thickness of the electrolyte layer is maintained in charging and discharging and before and after the charging and the discharging. In FIG. 2A, by discharging after charging, the thicknesses of the negative electrode active material layer 205 and the positive electrode active material layer 204 can return to the states before the charging. Note that in this specification, in the case where a change in thickness by charging and discharging or a difference between measured values is within 5%, the thicknesses or the measured values are regarded as being "equal" or "the same".

As a combination of the positive electrode active material layer 204 and the negative electrode active material layer 205 used in the solid-state secondary battery of one embodiment of the present invention, it is preferable to use a lithium cobalt oxide for the positive electrode active material layer 204 and a material containing silicon and oxygen for the negative electrode active material layer 205. In that case, the rate of reduction in thickness of the lithium cobalt oxide by charging is lower than the rate of increase in thickness of the material containing silicon and oxygen in many cases. For this reason, the positive electrode active material layer 204 is preferably thicker than the negative electrode active material layer 205.

The solid electrolyte layer 202 included in the solid-state secondary battery of one embodiment of the present invention may have a function of changing the thickness in accordance with an increase in thickness of a negative electrode or a decrease in thickness of a positive electrode. FIG. 2B illustrates a state in that in the case where the total thickness of the negative electrode active material layer 205 and the positive electrode active material layer 204 is increased before and after charging, the thickness of the solid electrolyte layer 202 is decreased, whereby the total thickness z of the positive electrode active material layer 204, the solid electrolyte layer 202, and the negative electrode active material layer 205 is maintained before and after charging. That is, in the solid-state secondary battery of one embodiment of the present invention, the thickness between the positive electrode current collector and the negative electrode current collector layer is equal in charging and discharging and before and after the charging and the discharging. In FIG. 2A, by discharging after charging, the thicknesses of the negative electrode active material layer 205, the solid electrolyte layer 202, and the positive electrode active material layer 204 can return to the states before the charging. In that case, the film density of the solid electrolyte layer 202 is preferably low and the film density of the solid electrolyte layer 202 is preferably lower than the film density of the positive electrode active material layer 204 and the film density of the negative electrode active material layer 205.

The solid electrolyte layer 202 is preferably formed by a vacuum evaporation method. By a vacuum evaporation method, the solid electrolyte layer 202 can easily become the above-described film having a function of changing the thickness.

As the vacuum evaporation method, co-evaporation using a plurality of evaporation sources can be easily performed. Thus, by co-evaporation of materials having different ratios between silicon and oxygen (O/Si), the ratio between silicon and oxygen (O/Si) in the solid electrolyte layer 202 can be controlled. Note that the solid electrolyte layer 202 can be formed also by a sputtering method.

It is preferable that the ratio between silicon and oxygen (O/Si) in the solid electrolyte layer 202 be higher than 0 and lower than 2. With such a range, the solid electrolyte layer into which lithium ions are easily diffused and which has no electron conductivity can be achieved. Co-evaporation of silicon oxide serving as an electrolyte and an organic substance containing Li enables doping of Li and C, which can increase the Li ion conductivity.

The solid electrolyte layer 202 may have a stacked-layer structure. In the case of a stacked-layer structure, a material to which nitrogen is added to lithium phosphate ($Li_3PO_4$) (the material is also referred to as $Li_3PO_{4-y}N_y$:LiPON) may be stacked as one layer. Note that Y>0 is satisfied.

The ratio between silicon and oxygen (O/Si) in the solid electrolyte layer 202 is preferably higher than the ratio between silicon and oxygen (O/Si) in the negative electrode active material layer 205. With this structure, lithium ions are likely to be diffused in the solid electrolyte layer 202 and lithium ions are likely to be extracted or accumulated in the negative electrode active material layer 205, whereby a solid-state secondary battery with favorable characteristics can be achieved. The thermal expansion coefficient of the negative electrode active material layer 205 is preferably lower than the thermal expansion coefficient of the solid electrolyte layer 202.

Figure 3:
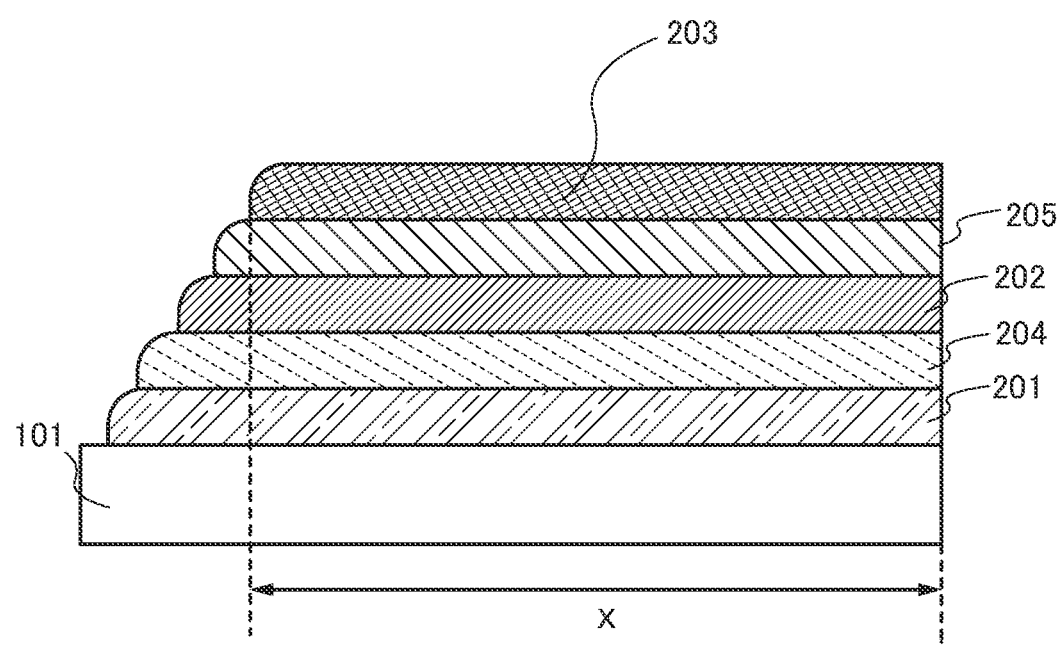
FIG. 3 is a cross-sectional view illustrating one embodiment of the present invention.

In the case where the above-described total thickness of the positive electrode active material layer 204, the solid electrolyte layer 202, and the negative electrode active material layer 205 is measured, it is preferable to obtain an average value of a thickness of a region sandwiched between the positive electrode current collector layer 201 and the negative electrode current collector layer 203. In the case of calculating the average value, it is preferable to use thicknesses of at least three points for the calculation. Note that in the solid-state secondary battery of one embodiment of the present invention, as illustrated in FIG. 3, a flat area of the negative electrode current collector layer 203 may be smaller than a flat area of the positive electrode current collector layer 201. In that case, in FIG. 3, a region denoted by x is a region sandwiched between the positive electrode current collector layer 201 and the negative electrode current collector layer 203, and it is preferable to calculate the total thickness of the positive electrode active material layer 204, the solid electrolyte layer 202, and the negative electrode active material layer 205 and the average value of the thickness from the region denoted by x. Note that the cross-sectional view in FIG. 3 shows part of the solid-state secondary battery of one embodiment of the present invention, which correspond to rounded end portions on only one side.

Note that there is no particular limitation on a method of forming the positive electrode current collector layer 201, the positive electrode active material layer 204, the solid electrolyte layer 202, the negative electrode active material layer 205, and the negative electrode current collector layer 203 included in the single-layer cell 150, and a vacuum evaporation method or a sputtering method can be used for the formation. As the sputtering method, for example, a reactive sputtering method, a collimated sputtering method, a low pressure long throw sputtering method, an ionization sputtering method (including a sputtering method using an unbalanced magnet), a sputtering method in which DC power and RF power overlap with each other, a sputtering method in which a capacitance value on a substrate side is variable, a sputtering method in which a bias is applied to a substrate side, or a sputtering method in which these are combined can be used.

In the case where the negative electrode active material layer 205 or the solid electrolyte layer 202 is formed using a film containing silicon and oxygen by a sputtering method, a variety of targets can be used as a sputtering target; for example, single crystal silicon, polycrystalline silicon, or the like can be used.

In the case where the positive electrode current collector layer or the negative electrode current collector layer is formed by a sputtering method, a positive electrode or a negative electrode is preferably deposited by a sputtering method; thus, the positive electrode active material layer or the negative electrode active material layer is preferably formed by a sputtering method. A sputtering apparatus is capable of successive deposition in one chamber or using a plurality of chambers and can also be a multi-chamber manufacturing apparatus or an in-line manufacturing apparatus. A sputtering method is a manufacturing method suitable for mass production that uses a chamber and a sputtering target. In addition, a sputtering method enables thin formation and thus excels in a deposition property.

For the positive electrode active material layer or the negative electrode active material layer, a gas phase method (a vacuum evaporation method, a thermal spraying method, a pulsed laser deposition method (a PLD method), an ion plating method, a cold spray method, or an aerosol deposition method) can also be used without limitation to a sputtering method. Note that an aerosol deposition (AD) method is a method in which deposition is performed without heating a substrate. The aerosol means microparticles dispersed in a gas.

The positive electrode, the negative electrode, the positive electrode active material layer, or the negative electrode active material layer may be deposited by a CVD method or an ALD (Atomic layer Deposition) method.

Structure Example 2 of Solid-State Secondary Battery

Figure 4A:
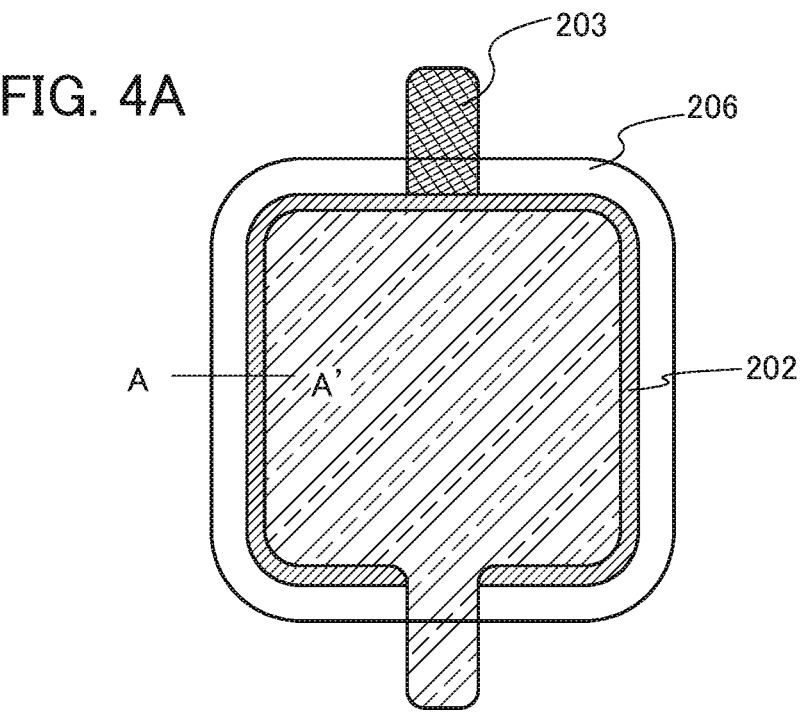
FIG. 4A and FIG. 4B are a top view and a cross-sectional view illustrating one embodiment of the present invention.
Figure 4B:
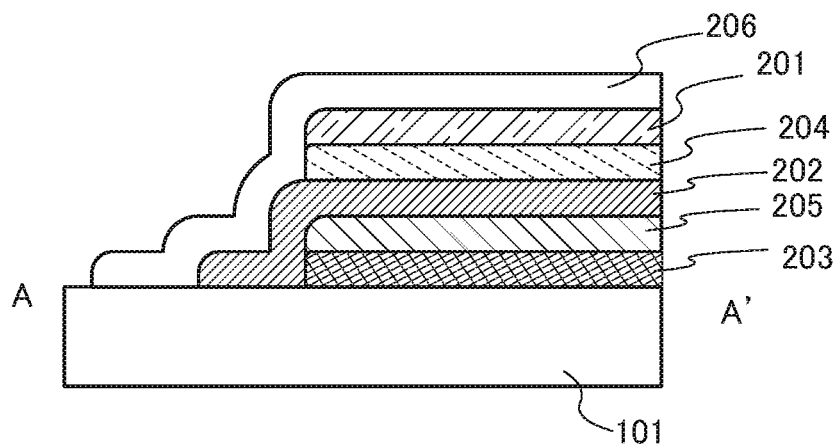

FIG. 4A and FIG. 4B show an example of a stacking order different from that in FIG. 1. FIG. 4A is a top view, and FIG. 4B corresponds to a cross-sectional view taken along line AN in FIG. 4A.

As shown in FIG. 4B, the negative electrode current collector layer 203 is formed over the substrate 101, and the negative electrode active material layer 205, the solid electrolyte layer 202, the positive electrode active material layer 204, the positive electrode current collector layer 201, and a protection layer 206 are stacked in this order over the negative electrode current collector layer 203.

Each of these films can be formed using a metal mask. The negative electrode current collector layer 203, the negative electrode active material layer 205, the positive electrode active material layer 204, the positive electrode current collector layer 201, and the protection layer 206 may be selectively formed by a sputtering method. The solid electrolyte layer 202 is selectively formed using a metal mask by a co-evaporation method. The solid electrolyte layer 202 is formed by evaporation of a Si powder (SiO) or by co-evaporation of a plurality of Si powders (SiO) having different ratios between silicon and oxygen (O/Si). Note that a resistance heating source or an electron beam vapor source is used for the co-evaporation. Note that without limitation to the Si powder (SiO), particle-shaped one or pellet-shaped one may be used.

As shown in FIG. 4A, part of the negative electrode current collector layer 203 is exposed to form a negative electrode terminal portion. A region other than the negative electrode terminal portion is covered with the protection layer 206. In addition, part of the positive electrode current collector layer 201 is exposed to form a positive electrode terminal portion. A region other than the positive electrode terminal portion is covered with the protection layer 206.

Note that a silicon nitride film (also referred to as an SiN film) is used as the protection layer 206. The silicon nitride film is deposited by a sputtering method.

Through the series of steps described above, the thin-film-type solid-state secondary battery shown in FIG. 4A can be manufactured.

Embodiment 2

Figure 5:
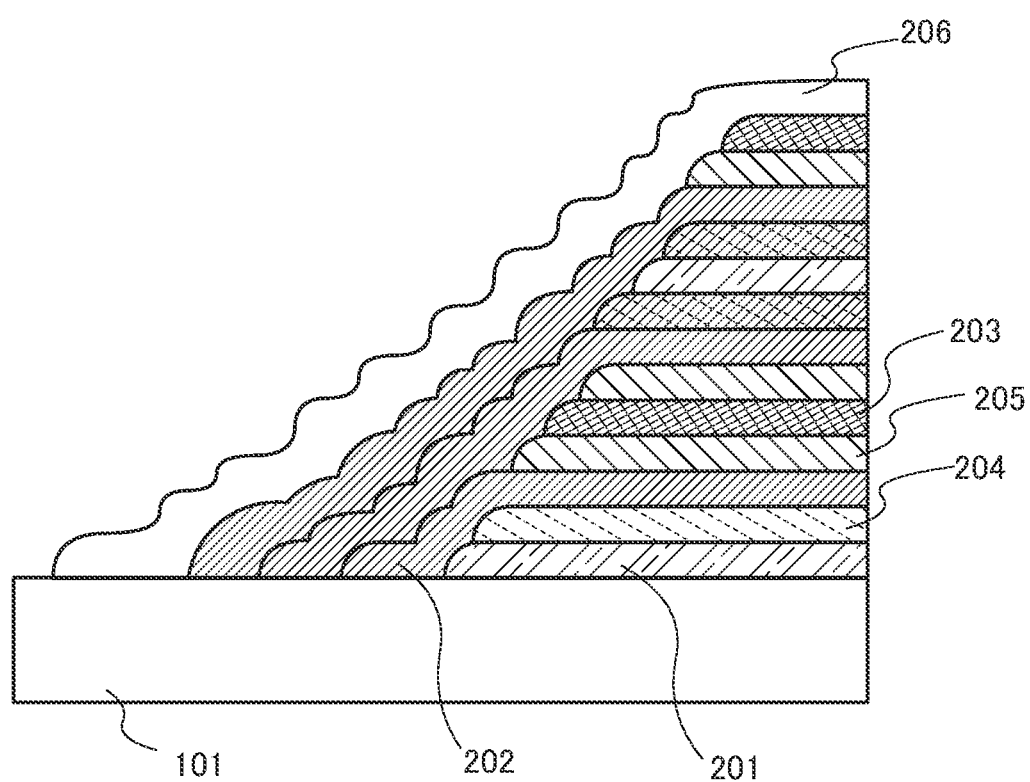
FIG. 5 is a cross-sectional view illustrating one embodiment of the present invention.
Figure 6:
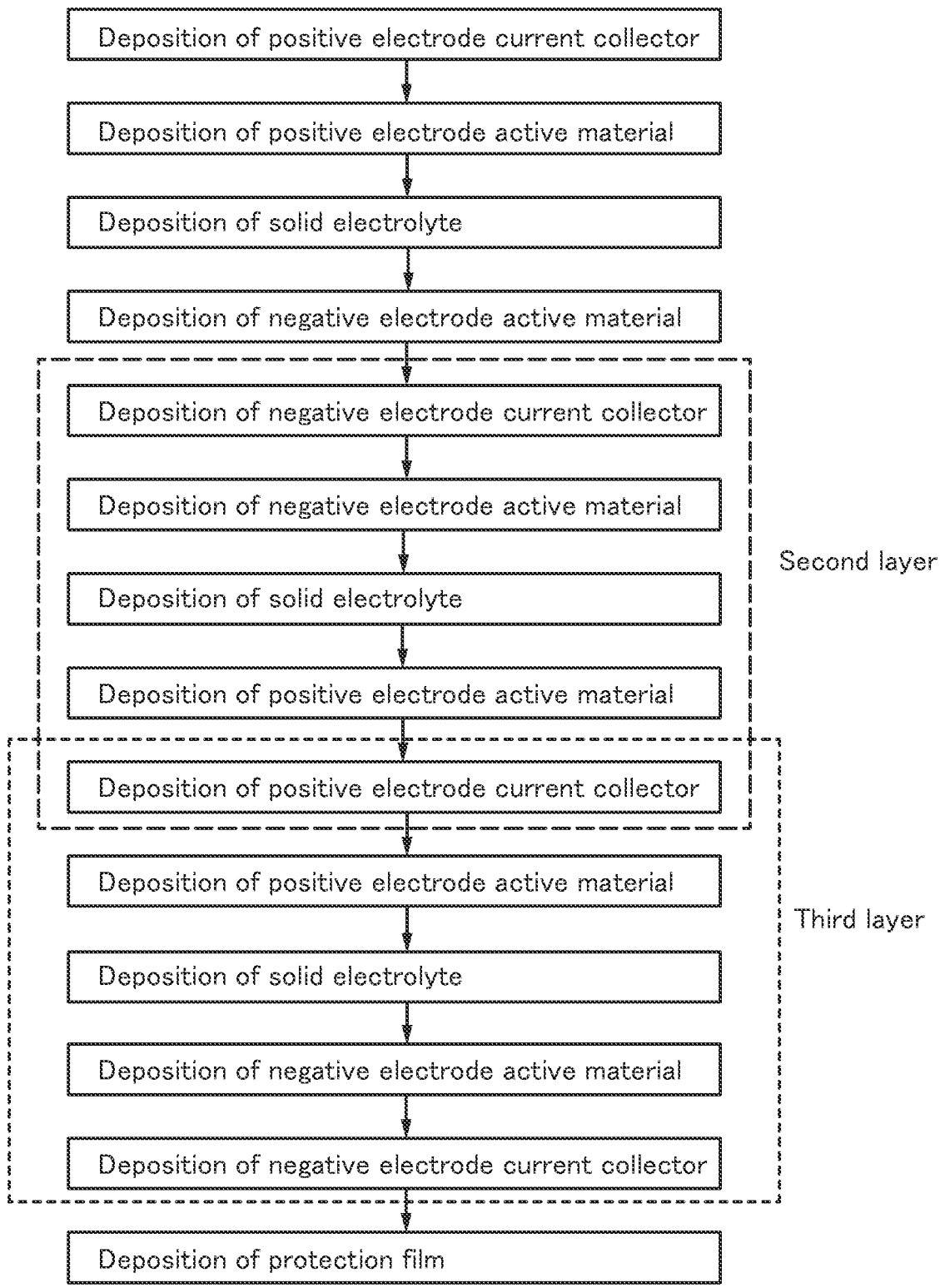
FIG. 6 is a diagram explaining a manufacturing flow of a solid-state secondary battery of one embodiment of the present invention.

An example of the single-layer cell is described in Embodiment 1, whereas an example of a multi-layer cell is described in this embodiment. FIG. 5 and FIG. 6 show one of embodiments describing the case of a multi-layer cell of a thin-film-type solid-state secondary battery.

Structure Example 3 of Solid-State Secondary Battery

FIG. 5 shows an example of a cross section of a three-layer cell.

A first cell is formed in such a manner that the positive electrode current collector layer 201 is formed over the substrate 101, and the positive electrode active material layer 204, the solid electrolyte layer 202, the negative electrode active material layer 205, and the negative electrode current collector layer 203 are sequentially formed over the positive electrode current collector layer 201.

Furthermore, a second cell is formed in such a manner that a second negative electrode active material layer, a second solid electrolyte layer, a second positive electrode active material layer, and a second positive electrode current collector layer are sequentially formed over the negative electrode current collector layer 203.

Moreover, a third cell is formed in such a manner that a third positive electrode active material layer, a third solid electrolyte layer, a third negative electrode active material layer, and a third negative electrode current collector layer are sequentially formed over the second positive electrode current collector layer.

Lastly, the protection layer 206 is formed in FIG. 4. The three-layer stack shown in FIG. 5 has a structure of series connection in order to increase voltage or the capacity but can be connected in parallel with an external wiring. Series connection, parallel connection, or series-parallel connection can also be selected with an external wiring.

Note that the solid electrolyte layer 202, the second solid electrolyte layer, the third solid electrolyte layer are preferably formed using the same material because the manufacturing cost can be reduced.

FIG. 6 shows an example of a manufacturing flow for obtaining the structure shown in FIG. 5.

In FIG. 5, it is preferable to use an LCO film as the positive electrode active material layer and a titanium film as the positive electrode current collector layer in order to reduce the manufacturing steps. Furthermore, it is preferable to use a silicon film as the negative electrode active material layer and a titanium film as the negative electrode current collector layer. Here, with use of a titanium film in common for the positive electrode current collector layer and the negative electrode current collector layer, a three-layer stacked cell can be achieved with a small number of components.

Embodiment 3

Figure 7:
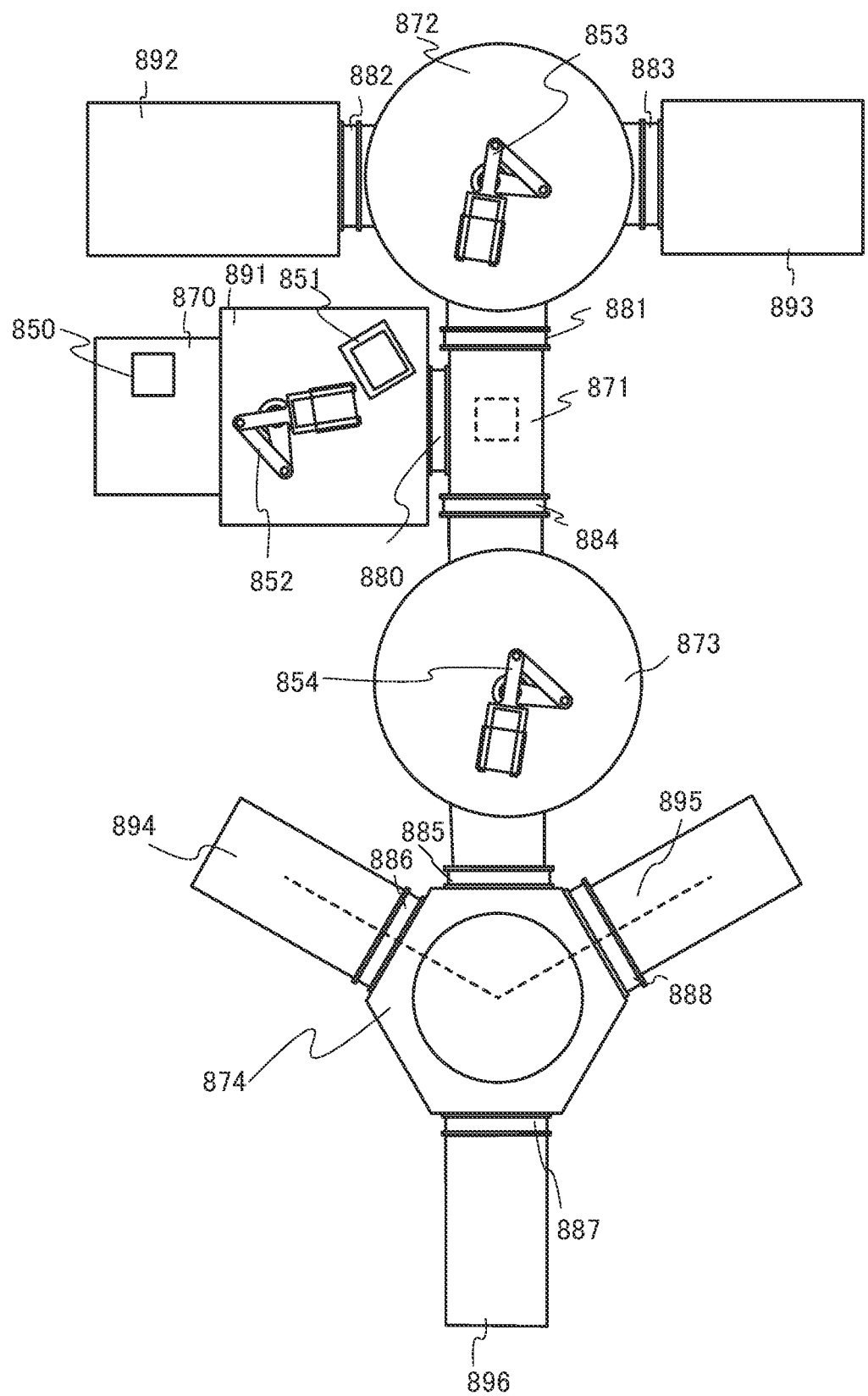
FIG. 7 is a schematic top view of a manufacturing apparatus for a solid-state secondary battery.

In this embodiment, FIG. 7 illustrates an example of a multi-chamber manufacturing apparatus capable of totally automating the manufacture from a positive electrode current collector layer to a negative electrode current collector layer in a secondary battery. The manufacturing apparatus can be suitably used for manufacturing the solid-state secondary battery of one embodiment of the present invention.

FIG. 7 illustrates an example of a multi-chamber manufacturing apparatus that includes gates 880, 881, 882, 883, 884, 885, 886, 887, and 888, a load lock chamber 870, a mask alignment chamber 891, a first transfer chamber 871, a second transfer chamber 872, a third transfer chamber 873, a plurality of deposition chambers (a first deposition chamber 892 and a second deposition chamber 874), a heating chamber 893, a second material supply chamber 894, a first material supply chamber 895, and a third material supply chamber 896.

The mask alignment chamber 891 includes at least a stage 851 and a substrate transfer mechanism 852.

The first transfer chamber 871 includes a substrate cassette raising and lowering mechanism, the second transfer chamber 872 includes a substrate transfer mechanism 853, and the third transfer chamber 873 includes a substrate transfer mechanism 854.

Each of the first deposition chamber 892, the second deposition chamber 874, the second material supply chamber 894, the first material supply chamber 895, the third material supply chamber 896, the mask alignment chamber 891, the first transfer chamber 871, the second transfer chamber 872, and the third transfer chamber 873 is connected to an exhaust mechanism. The exhaust mechanism is selected in accordance with usage of the respective chambers, and may be, for example, an exhaust mechanism including a pump having an adsorption unit, such as a cryopump, a sputtering ion pump, or a titanium sublimation pump, an exhaust mechanism including a turbo molecular pump provided with a cold trap, or the like.

In a process of deposition on the substrate, the substrate 850 or the substrate cassette is set in the load lock chamber 870, and transferred to the mask alignment chamber 891 by the substrate transfer mechanism 852. A mask to be used is picked up among a plurality of masks set in advance in the mask alignment chamber 891, and its position is aligned with the substrate over the stage 851. After the position alignment, the gate 880 is opened, and transferring to the first transfer chamber 871 is performed by the substrate transfer mechanism 852. After the substrate is transferred to the first transfer chamber 871, the gate 881 is opened, and transferring to the second transfer chamber 872 is performed by the substrate transfer mechanism 853.

The first deposition chamber 892 provided in the second transfer chamber 872 through the gate 882 is a sputtering deposition chamber. The sputtering deposition chamber has a mechanism of applying voltage to the sputtering target by switching an RF power supply and a pulsed DC power supply. Furthermore, two or three kinds of sputtering targets can be set. In this embodiment, a single crystal silicon target, a sputtering target containing lithium cobalt oxide ($LiCoO_2$) as a main component, and a titanium target are set. It is possible to provide a substrate heating mechanism in the first deposition chamber 892 and perform deposition while heating is performed up to a heater temperature of 700° C.

The negative electrode active material layer can be formed by a sputtering method using a single crystal silicon target. An SiO$_X$ film formed by a reactive sputtering method using an Ar gas and an O$_2$ gas may be used as the negative electrode active material layer in the negative electrode. A silicon nitride film formed by a reactive sputtering method using an Ar gas and an N$_2$ gas can be used as a sealing film. The positive electrode active material layer can be formed by a sputtering method using a sputtering target containing lithium cobalt oxide (LiCoO$_2$) as a main component. A conductive film to be a current collector can be formed by a sputtering method using a titanium target. A titanium nitride film formed by a reactive sputtering method using an Ar gas and an N$_2$ gas can be used as a diffusion prevention layer between the current collector layer and the active material layer.

In the case where the positive electrode active material layer is formed, the mask and the substrate in an overlapped state are transferred from the second transfer chamber 872 to the first deposition chamber 892 by the substrate transfer mechanism 853, the gate 882 is closed, and then deposition is performed by a sputtering method. After the deposition, the gate 882 and the gate 883 are opened, transferring to the heating chamber 893 is performed, the gate 883 is closed, and then heating can be performed. For this heat treatment in the heating chamber 893, an RTA (Rapid Thermal Anneal) apparatus, a resistance heating furnace, or a microwave heating apparatus can be used. As the RTA apparatus, a GRTA (Gas Rapid Thermal Anneal) apparatus or an LRTA (Lamp Rapid Thermal Anneal) apparatus can be used. The heat treatment in the heating chamber 893 can be performed in an atmosphere of nitrogen, oxygen, a rare gas, or dry air. In addition, heating time is longer than or equal to 1 minute and shorter than or equal to 24 hours.

After the deposition or the heat treatment, the substrate and the mask are returned to the mask alignment chamber 891 and position alignment for a new mask is performed. The substrate and the mask after being subjected to the position alignment are transferred to the first transfer chamber 871 by the substrate transfer mechanism 852. The substrate is transferred by the raising and lowering mechanism of the first transfer chamber 871, the gate 884 is opened, and transferring to the third transfer chamber 873 is performed by the substrate transfer mechanism 854.

In the second deposition chamber 874 which is connected to the third transfer chamber 873 through the gate 885, deposition is performed by evaporation.

Figure 8:
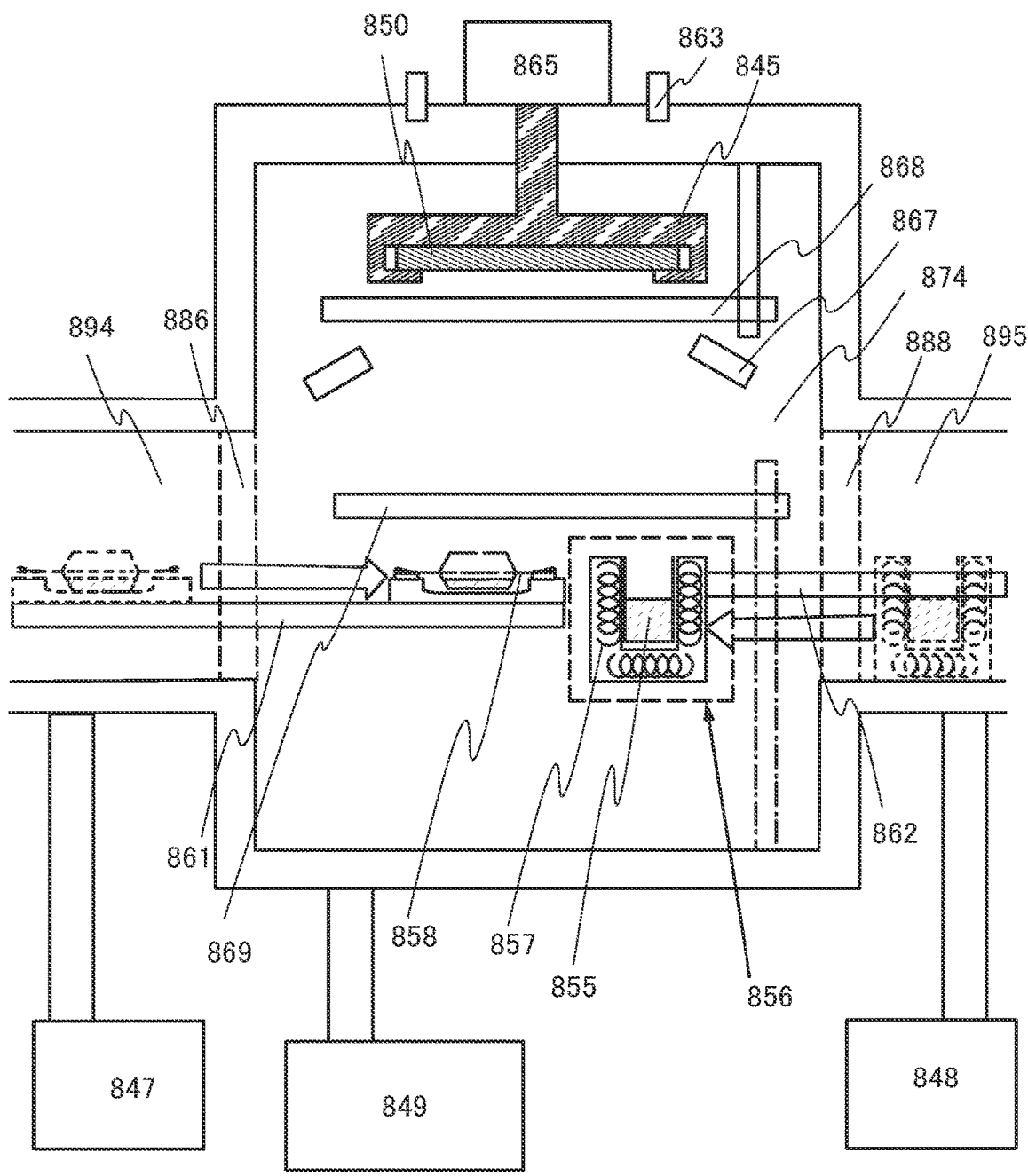
FIG. 8 is a cross-sectional view of part of a manufacturing apparatus for a solid-state secondary battery.

FIG. 8 illustrates an example of a cross-sectional structure of the second deposition chamber 874. FIG. 8 corresponds to a schematic cross-sectional view taken along the dotted line in FIG. 7. The second deposition chamber 874 is connected to the exhaust mechanism 849, and the first material supply chamber 895 is connected to the exhaust mechanism 848. The second material supply chamber 894 is connected to the exhaust mechanism 847. The second deposition chamber 874 illustrated in FIG. 8 is an evaporation chamber where evaporation is performed using an evaporation source 856 that is transferred from the first material supply chamber 895. Evaporation sources are transferred from a plurality of material supply chambers and evaporation by vaporizing a plurality of substances at the same time, that is, co-evaporation can be performed. FIG. 8 illustrates an evaporation source including an evaporation boat 858 transferred from the second material supply chamber 894.

The second deposition chamber 874 is connected to the second material supply chamber 894 through the gate 886. The second deposition chamber 874 is connected to the first material supply chamber 895 through the gate 888. The second deposition chamber 874 is connected to the third material supply chamber 896 through the gate 887. Thus, ternary co-evaporation is possible in the second deposition chamber 874.

In a process of evaporation, the substrate is provided in the substrate holding portion 845. The substrate holding portion 845 is connected to a rotation mechanism 865. Then, the first evaporation material 855 is heated to some extent in the first material supply chamber 895, the gate 888 is opened when the evaporation rate becomes stable, and an arm 862 is extended so that the evaporation source 856 is positioned below the substrate. The evaporation source 856 includes the first evaporation material 855, a heater 857, and a container for storing the first evaporation material 855. Also in the second material supply chamber 894, the second evaporation material is heated to some extent, the gate 886 is opened when the evaporation rate becomes stable, and an arm 861 is extended so that the evaporation source is positioned below the substrate.

After that, a shutter 868 and an evaporation source shutter 869 are opened, and co-evaporation is performed. During the evaporation, the rotation mechanism 865 is rotated in order to improve the uniformity of the thickness. The substrate after being subjected to the evaporation is transferred to the mask alignment chamber 891 on the same route. In the case where the substrate is extracted from the manufacturing apparatus, the substrate is transferred from the mask alignment chamber 891 to the load lock chamber 870 and extracted.

FIG. 8 illustrates an example where the substrate 850 and a mask are held by the substrate holding portion 845. The substrate 850 (and the mask) is rotated by a substrate rotation mechanism, so that uniformity of deposition can be increased. The substrate rotation mechanism may also serve as a substrate transfer mechanism.

The second deposition chamber 874 may include an imaging unit 863 such as a CCD camera. With the provision of the imaging unit 863, the position of the substrate 850 can be confirmed.

In the second deposition chamber 874, the thickness of a film deposited on a substrate surface can be estimated from results of measurements by a film thickness measurement mechanism 867. The film thickness measurement mechanism 867 may include a crystal oscillator, for example.

Note that in order to control the evaporation of the vaporized evaporation material, the shutter 868 overlapping with the substrate and the evaporation source shutter 869 overlapping with the evaporation source 856 and the evaporation boat 858 are provided until the vaporization rate of the evaporation material becomes stable.

In the evaporation source 856, an example of a resistance heating method is shown, but an EB (Electron Beam) evaporation method may be employed. In addition, although an example of a crucible is shown as the container for the evaporation source 856 is shown, an evaporation boat may be used. As the first evaporation material 855, an organic material is put into the crucible heated by the heater 857. In the case where pellet-like or particle-like SiO or the like is used as the evaporation material, the evaporation boat 858 is used. The evaporation boat 858 is composed of three parts, and obtained by overlapping a member having a concave surface, a middle lid having two openings, and a top lid having one opening. Note that the evaporation may be performed after the middle lid is removed. The evaporation boat 858 functions as a resistor when current flows therethrough, and has a mechanism of heating itself.

Although an example of a multi-chamber apparatus is described in this embodiment, there is no particular limitation and an in-line manufacturing apparatus may be used.

Embodiment 4

Figure 9A:
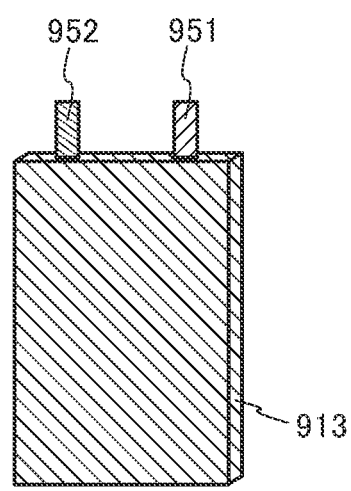
FIG. 9A is a perspective view illustrating an example of a battery cell.

FIG. 9A is an external view of a thin-film-type solid-state secondary battery. The secondary battery 913 includes a terminal 951 and a terminal 952. The terminal 951 and the terminal 952 are electrically connected to a positive electrode and a negative electrode, respectively.

Figure 9B:
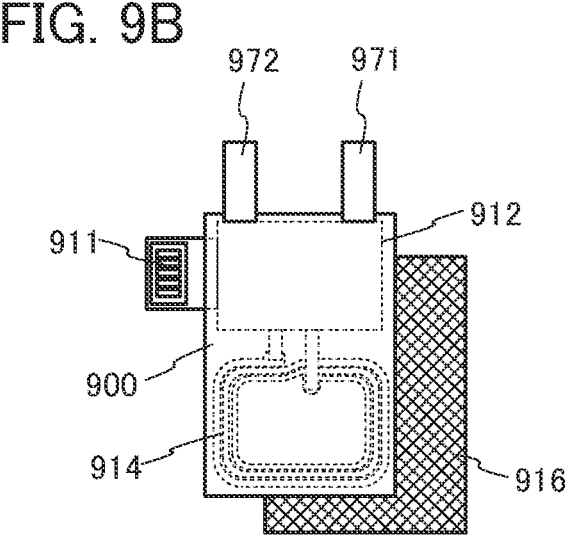
FIG. 9B is a perspective view of a circuit.

FIG. 9B is an external view of a battery control circuit. The battery control circuit shown in FIG. 9B includes a substrate 900 and a layer 916. A circuit 912 and an antenna 914 are provided over the substrate 900. The antenna 914 is electrically connected to the circuit 912. The terminal 971 and the terminal 972 are electrically connected to the circuit 912. The circuit 912 is electrically connected to the terminal 911.

The terminal 911 is connected to a device to which electric power of the thin-film-type solid-state secondary battery is supplied, for example. For example, the terminal 911 is connected to a display device, a sensor, or the like.

The layer 916 has a function of blocking an electromagnetic field from the secondary battery 913, for example. As the layer 916, for example, a magnetic body can be used.

Figure 9C:
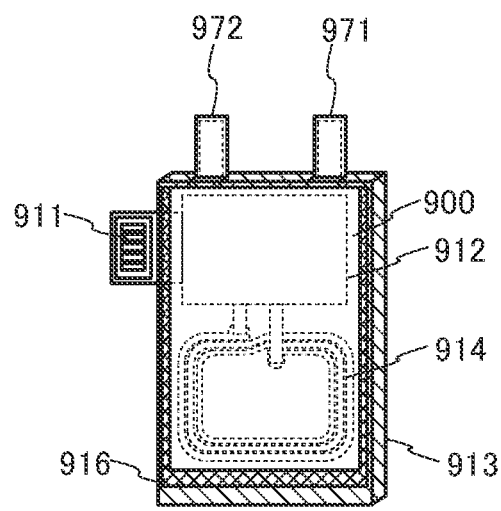
FIG. 9C is a perspective view of the battery cell and the circuit which overlap with each other.

FIG. 9C shows an example in which the battery control circuit shown in FIG. 9B is provided over the secondary battery 913. The terminal 971 and the terminal 972 are electrically connected to the terminal 951 and the terminal 952, respectively. The layer 916 is provided between the substrate 900 and the secondary battery 913.

A substrate having flexibility is preferably used as the substrate 900.

By using a substrate having flexibility as the substrate 900, a thin battery control circuit can be achieved. As shown in FIG. 10D described later, the battery control circuit can be wound around the secondary battery.

Figure 10A:
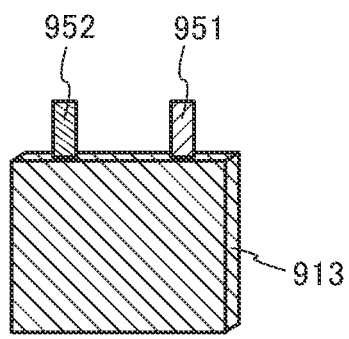
FIG. 10A is a perspective view illustrating an example of a battery cell.
Figure 10B:
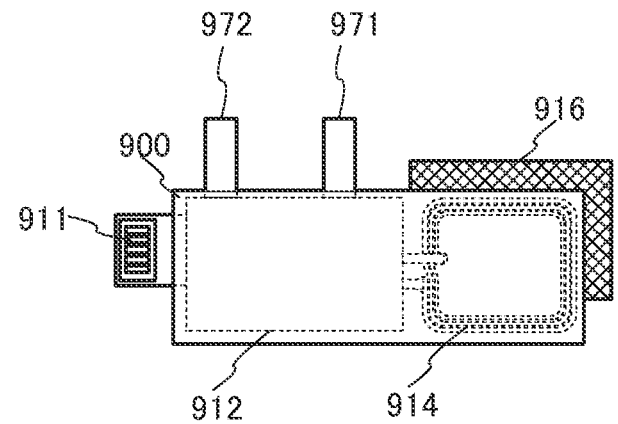
FIG. 10B is a perspective view of a circuit.

FIG. 10A is an external view of a thin-film-type solid-state secondary battery. A battery control circuit shown in FIG. 10B includes the substrate 900 and the layer 916.

Figure 10C:
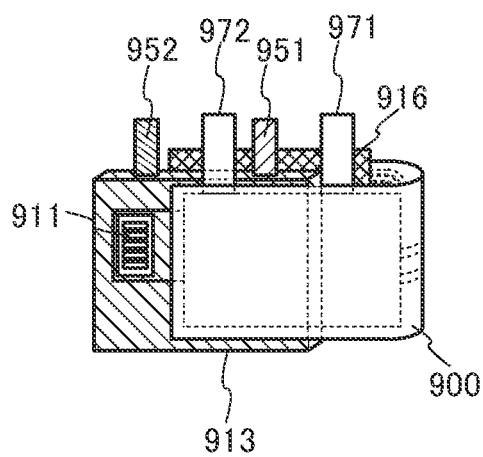
FIG. 10C and FIG. 10D are perspective views of the overlapping.
Figure 10D:
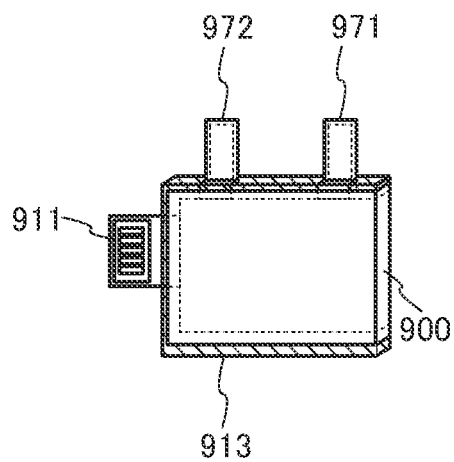

As shown in FIG. 10C, the substrate 900 is bent to fit the shape of the secondary battery 913, and the battery control circuit is provided around the secondary battery, whereby the battery control circuit can be wound around the secondary battery as shown in FIG. 10D.

Embodiment 5

In this embodiment, structures of a transistor that can be used in the battery control circuit described in the above embodiment are described. Specifically, a structure in which transistors having different electrical characteristics are stacked is described. With the structure, the degree of freedom in design of the semiconductor device can be increased. Stacking transistors having different electrical characteristics can increase the integration degree of the semiconductor device.

Figure 11:
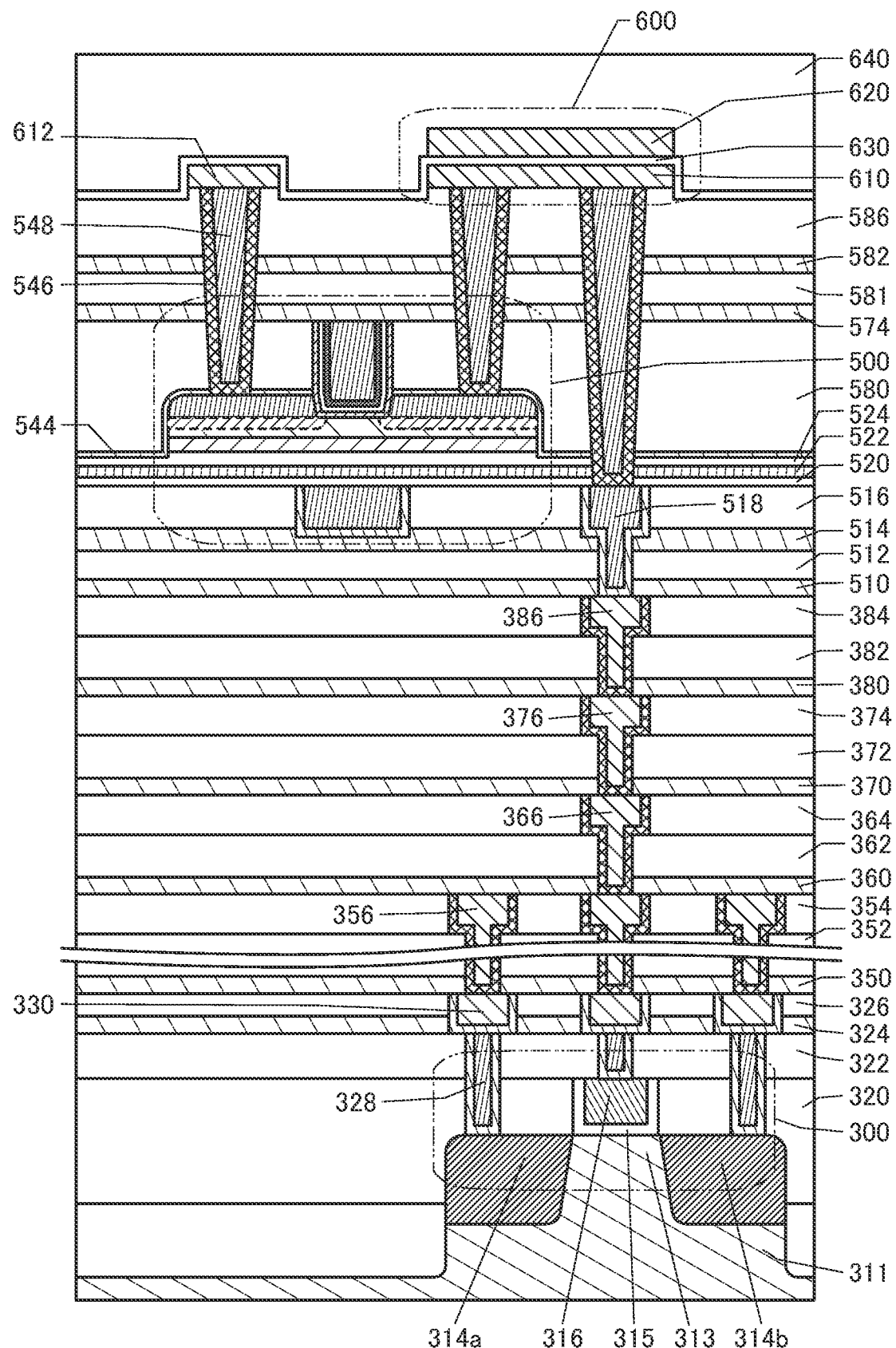
FIG. 11 is a diagram illustrating a structure example of a semiconductor device.
Figure 13A:
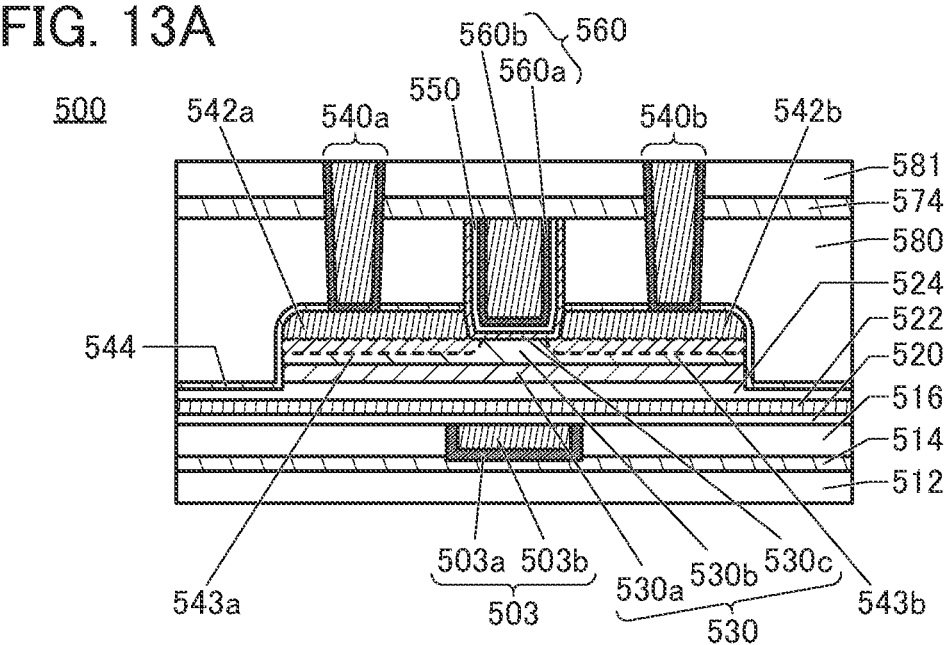
FIG. 13A, FIG. 13B, and FIG. 13C are diagrams illustrating structure examples of semiconductor devices.
Figure 13B:
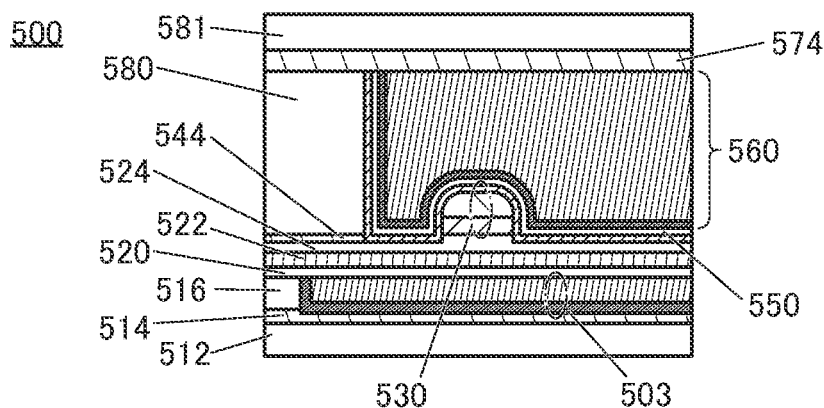
Figure 13C:
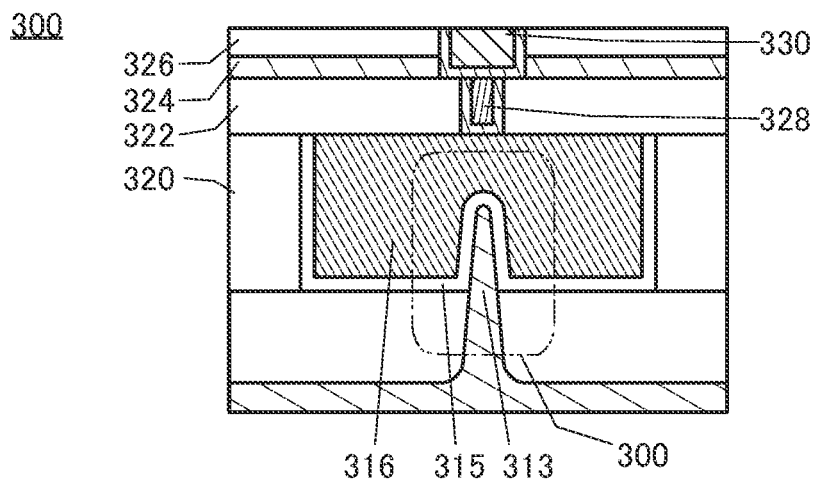

A semiconductor device shown in FIG. 11 includes a transistor 300, a transistor 500, and a capacitor 600. FIG. 13A is a cross-sectional view of the transistor 500 in the channel length direction, FIG. 13B is a cross-sectional view of the transistor 500 in the channel width direction, and FIG. 13C is a cross-sectional view of the transistor 300 in the channel width direction.

The transistor 500 is an OS transistor. Since the off-state current of the transistor 500 is extremely low, the use of the transistor 500 as a transistor included in a semiconductor device enables long-term retention of written data voltage or charges. In other words, power consumption of the semiconductor device can be reduced because the semiconductor device has a low frequency of refresh operation or requires no refresh operation.

The semiconductor device described in this embodiment includes the transistor 300, the transistor 500, and the capacitor 600, as shown in FIG. 11. The transistor 500 is provided above the transistor 300, and the capacitor 600 is provided above the transistor 300 and the transistor 500.

The transistor 300 is provided over a substrate 311 and includes a conductor 316, an insulator 315, a semiconductor region 313 that is part of the substrate 311, and a low-resistance region 314a and a low-resistance region 314b each functioning as a source region or a drain region.

As shown in FIG. 13C, in the transistor 300, a top surface and a side surface in the channel width direction of the semiconductor region 313 are covered with the conductor 316 with the insulator 315 therebetween. Such a Fin-type transistor 300 can have an increased effective channel width, and thus have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b each functioning as a source region or a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 300 may be an HEMT (High Electron Mobility Transistor) with the use of GaAs and GaAlAs, or the like.

The low-resistance region 314a and the low-resistance region 314b contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 12:
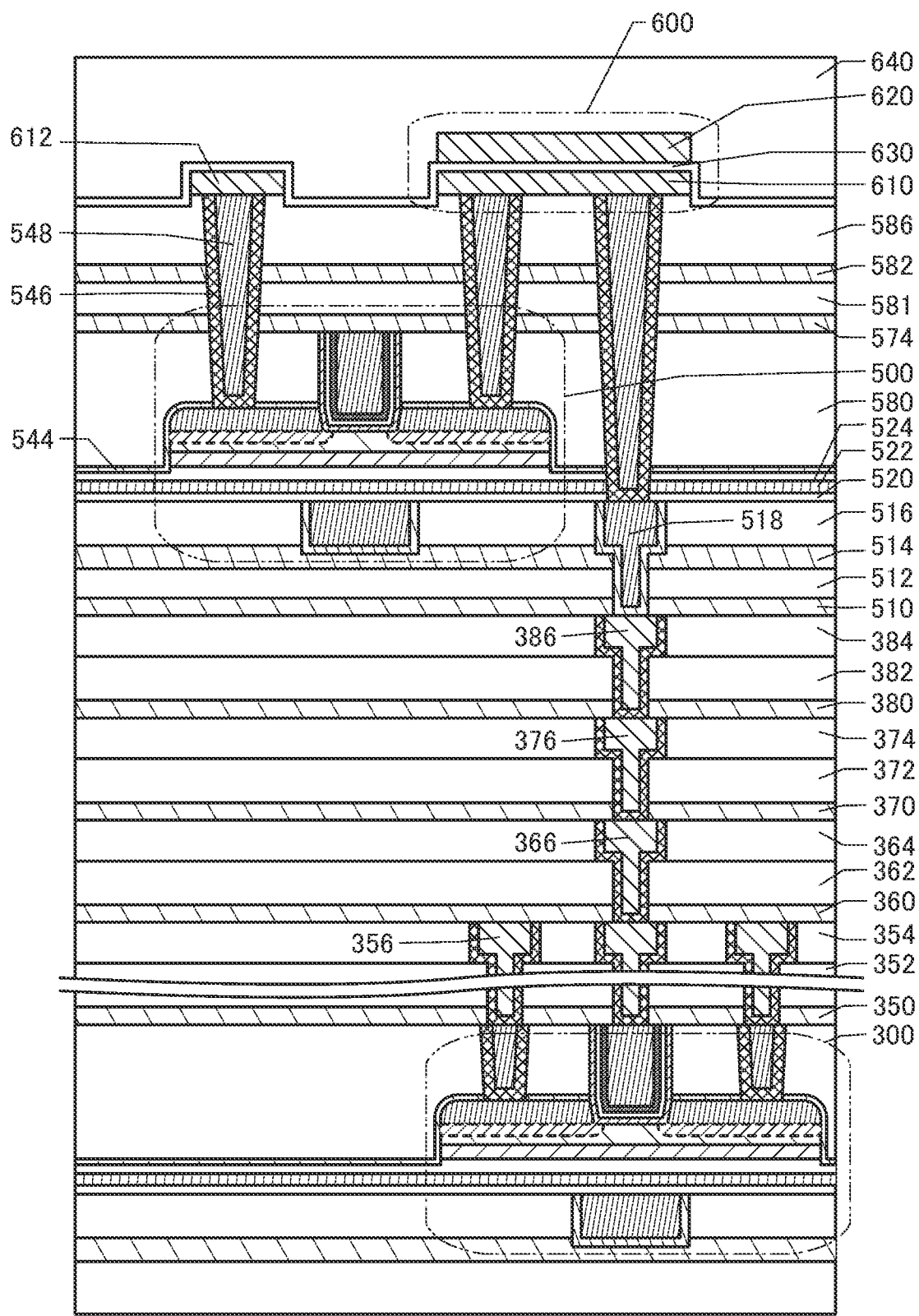
FIG. 12 is a diagram illustrating a structure example of a semiconductor device.

Note that the transistor 300 shown in FIG. 11 is an example and the structure is not limited thereto; an appropriate transistor is used in accordance with a circuit structure or a driving method. In the case where all the transistors included in the semiconductor device are OS transistors and have the same conductivity, which means the same-polarity transistors such as n-channel transistors only, for example, the transistor 300 has a structure similar to that of the transistor 500 including an oxide semiconductor as shown in FIG. 12. Note that the details of the transistor 500 are described later.

An insulator 320, an insulator 322, an insulator 324, and an insulator 326 are stacked sequentially to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that contains oxygen at a higher proportion than nitrogen, and silicon nitride oxide refers to a material that contains nitrogen at a higher proportion than oxygen. Furthermore, in this specification, aluminum oxynitride refers to a material that contains oxygen at a higher proportion than nitrogen, and aluminum nitride oxide refers to a material that contains nitrogen at a higher proportion than oxygen.

The insulator 322 may have a function of a planarization film for eliminating a level difference caused by the transistor 300 or the like provided below the insulator 322. For example, a top surface of the insulator 322 may be planarized by planarization treatment using a chemical mechanical polishing (CMP) method or the like to increase planarity.

In addition, for the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film from which a small amount of hydrogen is released.

The amount of released hydrogen can be analyzed by thermal desorption spectroscopy (TDS) or the like, for example. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the permittivity of the insulator 326 is preferably lower than that of the insulator 324. For example, the relative permittivity of the insulator 326 is preferably lower than 4, further preferably lower than 3. The relative permittivity of the insulator 326 is, for example, preferably 0.7 times or less, further preferably 0.6 times or less the relative permittivity of the insulator 324. When a material with a low permittivity is used for an interlayer film, parasitic capacitance generated between wirings can be reduced.

In addition, a conductor 328, a conductor 330, and the like that are connected to the capacitor 600 or the transistor 500 are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

A wiring layer may be provided over the insulator 326 and the conductor 330. For example, in FIG. 11, an insulator 350, an insulator 352, and an insulator 354 are stacked sequentially. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

Note that for example, as the insulator 350, like the insulator 324, an insulator having a barrier property against hydrogen is preferably used. Furthermore, the conductor 356 preferably contains a conductor having a barrier property against hydrogen. In particular, the conductor having a barrier property against hydrogen is formed in an opening portion of the insulator 350 having a barrier property against hydrogen. With this structure, the transistor 300 and the transistor 500 can be separated by a barrier layer, so that diffusion of hydrogen from the transistor 300 into the transistor 500 can be inhibited.

Note that for the conductor having a barrier property against hydrogen, tantalum nitride is preferably used, for example. In addition, using a stack of tantalum nitride and tungsten, which has high conductivity, can inhibit diffusion of hydrogen from the transistor 300 while the conductivity of a wiring is kept. In that case, a structure in which a tantalum nitride layer having a barrier property against hydrogen is in contact with the insulator 350 having a barrier property against hydrogen is preferable.

A wiring layer may be provided over the insulator 354 and the conductor 356. For example, in FIG. 11, an insulator 360, an insulator 362, and an insulator 364 are stacked sequentially. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

Note that for example, as the insulator 360, like the insulator 324, an insulator having a barrier property against hydrogen is preferably used. Furthermore, the conductor 366 preferably contains a conductor having a barrier property against hydrogen. In particular, the conductor having a barrier property against hydrogen is formed in an opening portion of the insulator 360 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 364 and the conductor 366. For example, in FIG. 11, an insulator 370, an insulator 372, and an insulator 374 are stacked sequentially. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

Note that for example, as the insulator 370, like the insulator 324, an insulator having a barrier property against hydrogen is preferably used. Furthermore, the conductor 376 preferably contains a conductor having a barrier property against hydrogen. In particular, the conductor having a barrier property against hydrogen is formed in an opening portion of the insulator 370 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 374 and the conductor 376. For example, in FIG. 11, an insulator 380, an insulator 382, and an insulator 384 are stacked sequentially. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

Note that for example, as the insulator 380, like the insulator 324, an insulator having a barrier property against hydrogen is preferably used. Furthermore, the conductor 386 preferably contains a conductor having a barrier property against hydrogen. In particular, the conductor having a barrier property against hydrogen is formed in an opening portion of the insulator 380 having a barrier property against hydrogen. With this structure, the transistor 300 and the transistor 500 can be separated by a barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are stacked sequentially over the insulator 384. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property that prevents diffusion of hydrogen or impurities from the substrate 311, a region where the transistor 300 is provided, or the like into the region where the transistor 500 is provided. Therefore, a material similar to that for the insulator 324 can be used.

For the film having a barrier property against hydrogen, silicon nitride formed by a CVD method can be used, for example. Here, diffusion of hydrogen to a semiconductor element including an oxide semiconductor, such as the transistor 500, degrades the characteristics of the semiconductor element in some cases. Therefore, a film that inhibits hydrogen diffusion is preferably provided between the transistor 500 and the transistor 300. The film that inhibits hydrogen diffusion is specifically a film from which a small amount of hydrogen is released.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors of a change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for the protective film of the transistor 500.

In addition, for the insulator 512 and the insulator 516, a material similar to that for the insulator 320 can be used, for example. Furthermore, when a material with a comparatively low permittivity is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (a conductor 503 for example), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, the conductor 518 in a region in contact with the insulator 510 and the insulator 514 is preferably a conductor having a barrier property against oxygen, hydrogen, and water. With this structure, the transistor 300 and the transistor 500 can be separated by a layer having a barrier property against oxygen, hydrogen, and water; thus, diffusion of hydrogen from the transistor 300 into the transistor 500 can be inhibited.

The transistor 500 is provided above the insulator 516.

As shown in FIG. 13A and FIG. 13B, the transistor 500 includes the conductor 503 positioned to be embedded in the insulator 514 and the insulator 516; an insulator 520 positioned over the insulator 516 and the conductor 503; an insulator 522 positioned over the insulator 520; an insulator 524 positioned over the insulator 522; an oxide 530a positioned over the insulator 524; an oxide 530b positioned over the oxide 530a; a conductor 542a and a conductor 542b positioned apart from each other over the oxide 530b; an insulator 580 that is positioned over the conductor 542a and the conductor 542b and is provided with an opening formed to overlap with a region between the conductor 542a and the conductor 542b; an oxide 530c positioned on a bottom and a side surface of the opening; an insulator 550 positioned on a formation surface of the oxide 530c; and a conductor 560 positioned on a formation surface of the insulator 550.

In addition, as shown in FIG. 13A and FIG. 13B, an insulator 544 is preferably positioned between the insulator 580 and the oxide 530a, the oxide 530b, the conductor 542a, and the conductor 542b. Furthermore, as shown in FIG. 13A and FIG. 13B, the conductor 560 preferably includes a conductor 560a provided inside the insulator 550 and a conductor 560b provided to be embedded inside the conductor 560a. Moreover, as shown in FIG. 13A and FIG. 13B, an insulator 574 is preferably positioned over the insulator 580, the conductor 560, and the insulator 550.

Note that in this specification and the like, the oxide 530a, the oxide 530b, and the oxide 530c are sometimes collectively referred to as an oxide 530.

Note that although a structure of the transistor 500 in which three layers of the oxide 530a, the oxide 530b, and the oxide 530c are stacked in a region where a channel is formed and its vicinity is shown, the present invention is not limited thereto. For example, a single layer of the oxide 530b, a two-layer structure of the oxide 530b and the oxide 530a, a two-layer structure of the oxide 530b and the oxide 530c, or a stacked-layer structure of four or more layers may be employed. Furthermore, although the conductor 560 is shown to have a stacked-layer structure of two layers in the transistor 500, the present invention is not limited thereto. For example, the conductor 560 may have a single-layer structure or a stacked-layer structure of three or more layers. Moreover, the transistor 500 shown in FIG. 11 and FIG. 13A is an example and the structure is not limited thereto; an appropriate transistor is used in accordance with a circuit configuration or a driving method.

Here, the conductor 560 functions as a gate electrode of the transistor, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Therefore, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the switching speed of the transistor 500 can be improved, and the transistor 500 can have high frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered.

In this specification and the like, a transistor structure in which a channel formation region is electrically surrounded by electric fields of a pair of gate electrodes (a first gate electrode and a second gate electrode) is referred to as a surrounded channel (S-channel) structure. Furthermore, in this specification and the like, the surrounded channel (S-channel) structure has a feature in that the side surface and the vicinity of the oxide 530 that is in contact with the conductor 542a and the conductor 542b functioning as a source electrode and a drain electrode are of I-type like the channel formation region. Since the side surface and the vicinity of the oxide 530 that is in contact with the conductor 542a and the conductor 542b are in contact with the insulator 544, they can be of I-type like the channel formation region. Note that in this specification and the like, "I-type" can be equated with "highly purified intrinsic" to be described later. The S-channel structure disclosed in this specification and the like is different from a Fin-type structure and a planar structure. With the S-channel structure, resistance to a short-channel effect can be enhanced, that is, a transistor in which a short-channel effect is unlikely to occur can be provided.

In addition, the conductor 503 has a structure similar to that of the conductor 518; a conductor 503a is formed in contact with an inner wall of an opening in the insulator 514 and the insulator 516, and a conductor 503b is formed on the inner side. Note that although the transistor 500 having a structure in which the conductor 503a and the conductor 503b are stacked is shown, the present invention is not limited thereto. For example, the conductor 503 may be provided as a single layer or to have a stacked-layer structure of three or more layers.

Here, for the conductor 503a, a conductive material that has a function of inhibiting diffusion of impurities such as a hydrogen atom, a hydrogen molecule, a water molecule, and a copper atom (through which the impurities are unlikely to pass) is preferably used. Alternatively, it is preferable to use a conductive material that has a function of inhibiting diffusion of oxygen (e.g., at least one of an oxygen atom, an oxygen molecule, and the like) (through which oxygen is unlikely to pass). Note that in this specification, a function of inhibiting diffusion of impurities or oxygen means a function of inhibiting diffusion of any one or all of the impurities and oxygen.

For example, when the conductor 503a has a function of inhibiting diffusion of oxygen, a reduction in conductivity of the conductor 503b due to oxidation can be inhibited.

In addition, in the case where the conductor 503 also functions as a wiring, a conductive material with high conductivity that contains tungsten, copper, or aluminum as its main component is preferably used for the conductor 503b. Note that although the conductor 503 has a stacked layer of the conductor 503a and the conductor 503b in this embodiment, the conductor 503 may have a single-layer structure.

The insulator 520, the insulator 522, and the insulator 524 have a function of a second gate insulating film.

Here, as the insulator 524 that is in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies ($V_O$) in the oxide 530 can be reduced and the reliability of the transistor 500 can be improved. When hydrogen enters the oxygen vacancies in the oxide 530, such defects (hereinafter, referred to as $V_OH$ in some cases) serve as donors and generate electrons serving as carriers in some cases. In other cases, bonding of part of hydrogen to oxygen bonded to a metal atom generates electrons serving as carriers. Thus, a transistor including an oxide semiconductor that contains a large amount of hydrogen is likely to have normally-on characteristics. Moreover, hydrogen in an oxide semiconductor is easily transferred by a stress such as heat or an electric field; thus, a large amount of hydrogen in an oxide semiconductor might reduce the reliability of the transistor. In one embodiment of the present invention, $V_OH$ in the oxide 530 is preferably reduced as much as possible so that the oxide 530 becomes a highly purified intrinsic or substantially highly purified intrinsic oxide. It is effective to remove impurities such as moisture and hydrogen in an oxide semiconductor (sometimes described as dehydration or dehydrogenation treatment) and to compensate for oxygen vacancies by supplying oxygen to the oxide semiconductor (sometimes described as oxygen adding treatment) in order to obtain an oxide semiconductor whose $V_OH$ is sufficiently reduced. When an oxide semiconductor with sufficiently reduced impurities such as $V_OH$ is used for a channel formation region of a transistor, the transistor can have stable electrical characteristics.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably within the range of 100° C. to 700° C., or 100° C. to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of $V_OH$ is cut occurs, i.e., a reaction of $V_OH \rightarrow V_O + H$ occurs. Part of hydrogen generated at this time is bonded to oxygen to be $H_2O$, and removed from the oxide 530 or an insulator near the oxide 530 in some cases. Some hydrogen may be gettered into the conductor 542 (the conductor 542$a$ and the conductor 542$b$) in some cases.

For the microwave treatment, for example, an apparatus including a power supply that generates high-density plasma or an apparatus including a power supply that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator in the vicinity of the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate ($O_2/(O_2+Ar)$) is lower than or equal to 50%, preferably higher than or equal to 10% and lower than or equal to 30%.

In a manufacturing process of the transistor 500, heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies ($V_O$). The heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas or inert gas atmosphere.

Note that the oxygen adding treatment performed on the oxide 530 can promote a reaction in which oxygen vacancies in the oxide 530 are filled with supplied oxygen, i.e., a reaction of $V_O + O \rightarrow$ null. Furthermore, hydrogen remaining in the oxide 530 reacts with supplied oxygen, so that the hydrogen can be removed as $H_2O$ (dehydration). This can inhibit recombination of hydrogen remaining in the oxide 530 with oxygen vacancies and formation of $V_OH$.

In addition, in the case where the insulator 524 includes an excess-oxygen region, it is preferable that the insulator 522 have a function of inhibiting diffusion of oxygen (e.g., an oxygen atom, an oxygen molecule, or the like) (through which oxygen is unlikely to pass).

When the insulator 522 has a function of inhibiting diffusion of oxygen or impurities, oxygen contained in the oxide 530 is not diffused into the insulator 520 side, which is preferable. Furthermore, the conductor 503 can be inhibited from reacting with oxygen contained in the insulator 524 or the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate (SrTiO$_3$), or (Ba,Sr)TiO$_3$ (BST) are preferably used, for example. As miniaturization and high integration of transistors progress, a problem such as leakage current might arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is an insulating material having a function of inhibiting diffusion of impurities, oxygen, and the like (through which oxygen is unlikely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. The insulator over which silicon oxide, silicon oxynitride, or silicon nitride is stacked may be used.

In addition, it is preferable that the insulator 520 be thermally stable. For example, silicon oxide and silicon oxynitride are suitable because they are thermally stable. Furthermore, the combination of an insulator that is a high-k material and silicon oxide or silicon oxynitride enables the insulator 520 to have a stacked-layer structure that has thermal stability and a high relative permittivity.

In the transistor 500, a metal oxide functioning as an oxide semiconductor is preferably used as the oxide 530 including a channel formation region. For example, as the oxide 530, a metal oxide such as an In-M-Zn oxide (the element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. The In-M-Zn oxide that can be used as the oxide 530 is particularly preferably a CAAC-OS (c-axis aligned crystalline oxide semiconductor). Alternatively, a CAC-OS (Cloud-Aligned Composite oxide semiconductor) is preferable. Note that CAAC refers to an example of a crystal structure, and CAC refers to an example of a function or a material composition. Furthermore, as the oxide 530, an In—Ga oxide or an In—Zn oxide may be used.

A CAC-OS has a conducting function in part of the material and has an insulating function in another part of the material; as a whole, the CAC-OS has a function of a semiconductor. In the case where the CAC-OS or the CAC-metal oxide is used in an active layer of a transistor, the conducting function is a function of allowing electrons (or holes) serving as carriers to flow, and the insulating function is a function of not allowing electrons serving as carriers to flow. By the complementary action of the conducting function and the insulating function, a switching function (On/Off function) can be given to the CAC-OS or the CAC-metal oxide. In the CAC-OS or the CAC-metal oxide, separation of the functions can maximize each function.

In addition, the CAC-OS or the CAC-metal oxide includes conductive regions and insulating regions. The conductive regions have the above-described conducting function, and the insulating regions have the above-described insulating function. Furthermore, in some cases, the conductive regions and the insulating regions in the material are separated at the nanoparticle level. Furthermore, in some cases, the conductive regions and the insulating regions are unevenly distributed in the material. Furthermore, in some cases, the conductive regions are observed to be coupled in a cloud-like manner with their boundaries blurred.

Furthermore, in the CAC-OS or the CAC-metal oxide, the conductive regions and the insulating regions each having a size greater than or equal to 0.5 nm and less than or equal to 10 nm, preferably greater than or equal to 0.5 nm and less than or equal to 3 nm are dispersed in the material in some cases.

The CAC-OS or the CAC-metal oxide is composed of components having different band gaps. For example, the CAC-OS or the CAC-metal oxide is composed of a component having a wide gap due to the insulating region and a component having a narrow gap due to the conductive region. In the case of the structure, when carriers flow, carriers mainly flow in the component having a narrow gap. Furthermore, the component having a narrow gap complements the component having a wide gap, and carriers also flow in the component having a wide gap in conjunction with the component having a narrow gap. Therefore, in the case where the above-described CAC-OS or CAC-metal oxide is used in a channel formation region of a transistor, the transistor in an on state can achieve high current driving capability, that is, high on-state current and high field-effect mobility.

In other words, the CAC-OS or the CAC-metal oxide can also be referred to as a matrix composite or a metal matrix composite.

Note that metal oxides functioning as oxide semiconductors are classified into a single crystal oxide semiconductor and a non-single-crystal oxide semiconductor. Examples of a non-single-crystal oxide semiconductor include a CAAC-OS, a polycrystalline oxide semiconductor, an nc-OS (nanocrystalline oxide semiconductor), an amorphous-like oxide semiconductor (a-like OS), and an amorphous oxide semiconductor.

IGZO is roughly classified into "Amorphous", "Crystalline", and "Crystal". Amorphous includes completely amorphous structure. Crystalline includes CAAC (c-axis-aligned crystalline), nc (nanocrystalline), and CAC (Cloud-Aligned Composite). Note that single crystal, poly crystal, and completely amorphous are excluded from the category of "Crystalline". Crystal includes single crystal and poly crystal.

The CAAC-OS has c-axis alignment, a plurality of nanocrystals are connected in the a-b plane direction, and its crystal structure has distortion. Note that the distortion refers to a portion where the direction of a lattice arrangement changes between a region with a regular lattice arrangement and another region with a regular lattice arrangement in a region where the plurality of nanocrystals are connected.

The nanocrystal is basically a hexagon but is not always a regular hexagon and is a non-regular hexagon in some cases. Furthermore, a pentagonal or heptagonal lattice arrangement, for example, is included in the distortion in some cases. Note that it is difficult to observe a clear crystal grain boundary (also referred to as grain boundary) even in the vicinity of distortion in the CAAC-OS. That is, formation of a crystal grain boundary is found to be inhibited by the distortion of a lattice arrangement. This is because the CAAC-OS can tolerate distortion owing to a low density of arrangement of oxygen atoms in the a-b plane direction, an interatomic bond length changed by substitution of a metal element, and the like.

The CAAC-OS tends to have a layered crystal structure (also referred to as a layered structure) in which a layer containing indium and oxygen (hereinafter, an In layer) and a layer containing the element M, zinc, and oxygen (hereinafter, an (M,Zn) layer) are stacked. Note that indium and the element M can be replaced with each other, and when the element M in the (M,Zn) layer is replaced with indium, the layer can also be referred to as an (In,M,Zn) layer. Furthermore, when indium in the In layer is replaced with the element M, the layer can be referred to as an (In,M) layer.

The CAAC-OS is a metal oxide with high crystallinity. On the other hand, a clear crystal grain boundary cannot be observed in the CAAC-OS; thus, it can be said that a reduction in electron mobility due to the crystal grain boundary is unlikely to occur. Furthermore, entry of impurities, formation of defects, or the like might decrease the crystallinity of a metal oxide, which means that the CAAC-OS is a metal oxide including few impurities and defects (e.g., oxygen vacancies). Thus, a metal oxide including a CAAC-OS is physically stable. Therefore, the metal oxide including a CAAC-OS is resistant to heat and highly reliable.

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. Furthermore, there is no regularity of crystal orientation between different nanocrystals in the nc-OS. Thus, the orientation in the whole film is not observed. Accordingly, the nc-OS cannot be distinguished from an a-like OS or an amorphous oxide semiconductor by some analysis methods.

Note that In—Ga—Zn oxide (also referred to as "IGZO") that is a kind of metal oxide containing indium, gallium, and zinc has a stable structure in some cases by being formed of the above-described nanocrystals. In particular, crystals of IGZO tend not to grow in the air and thus, a stable structure is obtained when IGZO is formed of smaller crystals (e.g., the above-described nanocrystals) rather than larger crystals (here, crystals with a size of several millimeters or several centimeters).

An a-like OS is a metal oxide having a structure between those of the nc-OS and an amorphous oxide semiconductor. The a-like OS contains a void or a low-density region. That is, the a-like OS has low crystallinity compared with the nc-OS and the CAAC-OS.

An oxide semiconductor (metal oxide) can have various structures which show different properties. Two or more kinds of the amorphous oxide semiconductor, the polycrystalline oxide semiconductor, the a-like OS, the nc-OS, and the CAAC-OS may be included in an oxide semiconductor of one embodiment of the present invention.

Furthermore, a metal oxide with a low carrier concentration is preferably used in the transistor 500. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. Examples of impurities in a metal oxide include hydrogen, nitrogen, alkali metal, alkaline earth metal, iron, nickel, and silicon.

In particular, hydrogen contained in a metal oxide reacts with oxygen bonded to a metal atom to be water, and thus forms oxygen vacancies in the metal oxide in some cases. If the channel formation region in the metal oxide includes oxygen vacancies, the transistor sometimes has normally-on characteristics. In some cases, a defect that is an oxygen vacancy into which hydrogen enters functions as a donor and generates an electron serving as a carrier. In other cases, bonding of part of hydrogen to oxygen bonded to a metal atom generates electrons serving as carriers. Thus, a transistor using a metal oxide containing a large amount of hydrogen is likely to have normally-on characteristics.

A defect in which hydrogen has entered an oxygen vacancy can function as a donor of the metal oxide. However, it is difficult to evaluate the defects quantitatively. Thus, the metal oxide is sometimes evaluated by not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Consequently, when a metal oxide is used for the oxide 530, hydrogen in the metal oxide is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with a sufficiently reduced concentration of impurities such as hydrogen is used for a channel formation region of a transistor, the transistor can have stable electrical characteristics.

When a metal oxide is used for the oxide 530, the carrier density of the metal oxide in the channel formation region is preferably lower than or equal to $1\times10^{18}$ cm$^{-3}$, further preferably lower than $1\times10^{17}$ cm$^{-3}$, still further preferably lower than $1\times10^{16}$ cm$^{-3}$, still further preferably lower than $1\times10^{13}$ cm$^{-3}$, still further preferably lower than $1\times10^{12}$ cm$^{-3}$. Note that the lower limit of the carrier concentration of the metal oxide in the channel formation region is not particularly limited and can be, for example, $1\times10^{-9}$ cm$^{-3}$.

When a metal oxide is used for the oxide 530, contact between the conductor 542 (the conductor 542a and the conductor 542b) and the oxide 530 may make oxygen in the oxide 530 diffuse into the conductor 542, resulting in oxidation of the conductor 542. It is highly possible that oxidation of the conductor 542 lowers the conductivity of the conductor 542. Note that diffusion of oxygen in the oxide 530 into the conductor 542 can be interpreted as absorption of oxygen in the oxide 530 by the conductor 542.

When oxygen in the oxide 530 is diffused into the conductor 542 (the conductors 542a and 542b), a layer is sometimes formed between the conductor 542a and the oxide 530b, and between the conductor 542b and the oxide 530b. The layer contains more oxygen than the conductor 542 does, and thus presumably has an insulating property. In this case, a three-layer structure of the conductor 542, the layer, and the oxide 530b can be regarded as a three-layer structure of a metal, an insulator, and a semiconductor and is sometimes referred to as a MIS (Metal-Insulator-Semiconductor) structure or a diode junction structure having a MIS structure as its main part.

Note that the above-described layer is not necessarily formed between the conductor 542 and the oxide 530b, but the layer may be formed between the conductor 542 and the oxide 530c, or formed both between the conductor 542 and the oxide 530b and between the conductor 542 and the oxide 530c.

Furthermore, the metal oxide functioning as the channel formation region in the oxide 530 has a band gap of more than or equal to 2 eV, preferably more than or equal to 2.5 eV. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of a plurality of oxide layers that differ in the atomic ratio of metal atoms. Specifically, the atomic ratio of the element M to the constituent elements in the metal oxide used as the oxide 530a is preferably higher than the atomic ratio of the element M to the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. Moreover, a metal oxide that can be used as the oxide 530a or the oxide 530b can be used as the oxide 530c.

In addition, the energy of the conduction band minimum of each of the oxide 530a and the oxide 530c is preferably higher than the energy of the conduction band minimum of the oxide 530b. In other words, the electron affinity of each of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To obtain this, the densities of defect states in mixed layers formed at an interface between the oxide 530a and the oxide 530b and an interface between the oxide 530b and the oxide 530c are preferably made low.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a and the oxide 530c.

At this time, the oxide 530b serves as a main carrier path. When the oxide 530a and the oxide 530c have the above structures, the densities of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element; an alloy containing a combination of the above metal element; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

In addition, although the conductor 542a and the conductor 542b each having a single-layer structure are shown in FIG. 13, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

In addition, as shown in FIG. 13A, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier density of the region 543a (the region 543b) increases, and the region 543a (the region 543b) becomes a low-resistance region.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is unlikely to be crystallized by heat treatment in a later step. Note that the insulator 544 is not an essential component when the conductor 542a and the conductor 542b are oxidation-resistant materials or do not significantly lose their conductivity even after absorbing oxygen. Design is appropriately set in consideration of required transistor characteristics.

When the insulator 544 is included, diffusion of impurities such as water and hydrogen contained in the insulator 580 into the oxide 530b through the oxide 530c and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with an inner side (a top surface and a side surface) of the oxide 530c. Like the insulator 524, the insulator 550 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator from which oxygen is released by heating is provided as the insulator 550 in contact with the top surface of the oxide 530c, oxygen can be effectively supplied from the insulator 550 to the channel formation region of the oxide 530b through the oxide 530c. Furthermore, as in the insulator 524, the concentration of impurities such as water or hydrogen in the insulator 550 is preferably reduced. The thickness of the insulator 550 is preferably greater than or equal to 1 nm and less than or equal to 20 nm.

Furthermore, to efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current might arise because of a thinner gate insulating film. For that reason, when the insulator functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high relative permittivity.

Although the conductor 560 that functions as the first gate electrode and has a two-layer structure is shown in FIG. 13A and FIG. 13B, a single-layer structure or a stacked-layer structure of three or more layers may be employed.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560a has a function of inhibiting diffusion of oxygen, it is possible to inhibit a reduction in conductivity of the conductor 560b due to oxidation caused by oxygen contained in the insulator 550. As a conductive material having a function of inhibiting diffusion of oxygen, for example, tantalum, tantalum nitride, ruthenium, ruthenium oxide, or the like is preferably used. For the conductor 560a, the oxide semiconductor that can be used as the oxide 530 can be used. In that case, when the conductor 560b is deposited by a sputtering method, the conductor 560a can have a reduced electrical resistance value to be a conductor. Such a conductor can be referred to as an OC (Oxide Conductor) electrode.

In addition, a conductive material containing tungsten, copper, or aluminum as its main component is preferably used for the conductor 560b. Furthermore, the conductor 560b also functions as a wiring and thus a conductor having high conductivity is preferably used as the conductor 560b. For example, a conductive material containing tungsten, copper, or aluminum as its main component can be used. Moreover, the conductor 560b may have a stacked-layer structure, for example, a stacked-layer structure of the above conductive material and titanium or titanium nitride.

The insulator 580 is provided over the conductor 542a and the conductor 542b with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, resin, or the like. In particular, silicon oxide and silicon oxynitride are preferable because they are thermally stable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided in contact with the oxide 530c, oxygen in the insulator 580 can be efficiently supplied to the oxide 530 through the oxide 530c. Note that the concentration of impurities such as water or hydrogen in the insulator 580 is preferably reduced.

The opening of the insulator 580 is formed to overlap with the region between the conductor 542a and the conductor 542b. Accordingly, the conductor 560 is formed to be embedded in the opening of the insulator 580 and the region between the conductor 542a and the conductor 542b.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, excess-oxygen regions can be provided in the insulator 550 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540*a* and a conductor 540*b* are positioned in openings formed in the insulator 581, the insulator 574, the insulator 580, and the insulator 544. The conductor 540*a* and the conductor 540*b* are provided to face each other with the conductor 560 therebetween. The structures of the conductor 540*a* and the conductor 540*b* are similar to a structure of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors of a change in electrical characteristics of the transistor. Accordingly, aluminum oxide can prevent mixing of impurities such as hydrogen and moisture into the transistor 500 in the manufacturing process and after the manufacturing of the transistor. In addition, release of oxygen from the oxide included in the transistor 500 can be inhibited. Therefore, aluminum oxide is suitably used for the protective film of the transistor 500.

In addition, an insulator 586 is provided over the insulator 582. For the insulator 586, a material similar to that for the insulator 320 can be used. Furthermore, when a material with a comparatively low permittivity is used for these insulators, parasitic capacitance between wirings can be reduced. A silicon oxide film, a silicon oxynitride film, or the like can be used for the insulator 586, for example.

Furthermore, the conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 600, the transistor 500, or the transistor 300. The conductor 546 and the conductor 548 can be provided using materials similar to those for the conductor 328 and the conductor 330.

After the transistor 500 is formed, an opening may be formed to surround the transistor 500 and an insulator having a high barrier property against hydrogen or water may be formed to cover the opening. Surrounding the transistor 500 by the insulator having a high barrier property can prevent entry of moisture and hydrogen from the outside. Alternatively, a plurality of transistors 500 may be collectively surrounded by the insulator having a high barrier property against hydrogen or water. When an opening is formed to surround the transistor 500, for example, the formation of an opening reaching the insulator 522 or the insulator 514 and the formation of the insulator having a high barrier property in contact with the insulator 522 or the insulator 514 are suitable because these formation steps can also serve as part of the manufacturing steps of the transistor 500. The insulator having a high barrier property against hydrogen or water is formed using a material similar to that for the insulator 522 or the insulator 514, for example.

Next, the capacitor 600 is provided above the transistor 500. The capacitor 600 includes a conductor 610, a conductor 620, and an insulator 630.

In addition, a conductor 612 may be provided over the conductor 546 and the conductor 548. The conductor 612 has a function of a plug or a wiring that is connected to the transistor 500. The conductor 610 has a function of an electrode of the capacitor 600. Note that the conductor 612 and the conductor 610 can be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 612 and the conductor 610 each having a single-layer structure are shown in this embodiment, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 640 is provided over the conductor 620 and the insulator 630. The insulator 640 can be provided using a material similar to that for the insulator 320. In addition, the insulator 640 may function as a planarization film that covers an uneven shape therebelow.

With the use of this structure, a semiconductor device using a transistor including an oxide semiconductor can be miniaturized or highly integrated.

Examples of a substrate that can be used for the semiconductor device of one embodiment of the present invention include a glass substrate, a quartz substrate, a sapphire substrate, a ceramic substrate, a metal substrate (e.g., a stainless steel substrate, a substrate including stainless steel foil, a tungsten substrate, and a substrate including tungsten foil), a semiconductor substrate (e.g., a single crystal semiconductor substrate, a polycrystalline semiconductor substrate, and a compound semiconductor substrate), and a SOI (Silicon on Insulator) substrate. Alternatively, a plastic substrate having heat resistance to the processing temperature in this embodiment may be used. Examples of a glass substrate include a barium borosilicate glass substrate, an aluminosilicate glass substrate, an aluminoborosilicate glass substrate, and a soda lime glass substrate. Alternatively, crystallized glass or the like can be used.

Alternatively, a flexible substrate, an attachment film, paper including a fibrous material, a base film, or the like can be used as the substrate. As examples of the flexible substrate, the attachment film, the base material film, and the like, the following can be given. Examples include plastics typified by polyethylene terephthalate (PET), polyethylene naphthalate (PEN), polyether sulfone (PES), and polytetrafluoroethylene (PTFE). Another example is a synthetic resin such as acrylic. Other examples are polypropylene, polyester, polyvinyl fluoride, and polyvinyl chloride. Other examples are polyamide, polyimide, aramid, epoxy, an inorganic vapor deposition film, paper, and the like. In particular, the use of a semiconductor substrate, a single crystal substrate, an SOI substrate, or the like enables the manufacture of small-sized transistors with a small variation in characteristics, size, shape, or the like and with high current capability. When a circuit is formed with such transistors, lower power consumption of the circuit or higher integration of the circuit can be achieved.

A flexible substrate may be used as the substrate, and a transistor, a resistor, a capacitor, and/or the like may be formed directly over the flexible substrate. Alternatively, a separation layer may be provided between the substrate and the transistor, the resistor, the capacitor, and/or the like. After part or the whole of a semiconductor device is completed over the separation layer, the separation layer can be used for separation from the substrate and transfer to another substrate. In such a case, the transistor, the resistor, the capacitor, and/or the like can be transferred to a substrate having low heat resistance or a flexible substrate. As the separation layer, a stack of inorganic films, namely a tungsten film and a silicon oxide film, an organic resin film of polyimide or the like formed over a substrate, or a silicon film containing hydrogen can be used, for example.

That is, a semiconductor device may be formed over one substrate and then transferred to another substrate. Examples of a substrate to which a semiconductor device is transferred include, in addition to the above-described substrates over which transistors can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupro, rayon, or regenerated polyester), or the like), a leather substrate, and a rubber substrate. With the use of any of these substrates, a flexible semiconductor device or a highly durable semiconductor device can be manufactured, high heat resistance can be provided, or a reduction in weight or thickness can be achieved.

Embodiment 6

In this embodiment, examples of electronic devices using thin-film-type secondary batteries are described with reference to FIG. 14 and FIG. 15.

Figure 14A:
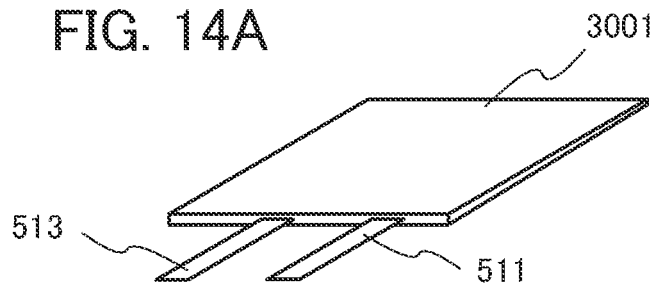
FIG. 14A is a perspective view of a battery cell.

FIG. 14A is an external perspective view of a thin-film-type secondary battery 3001. The thin-film-type secondary battery 3001 is subjected to sealing with a laminate film or an insulating film such that a positive electrode lead electrode 513 electrically connected to a positive electrode of a solid-state secondary battery and a negative electrode lead electrode 511 electrically connected to a negative electrode project.

Figure 14B:
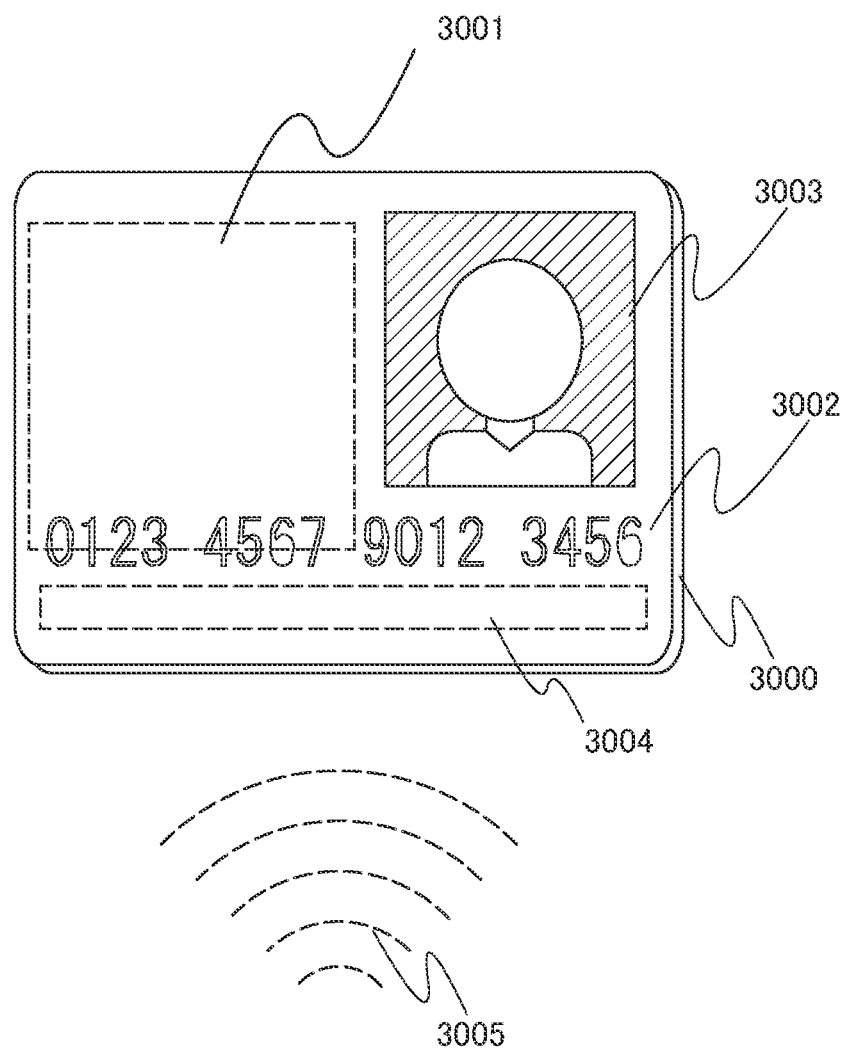
FIG. 14B is a diagram illustrating an example of an electronic device.

FIG. 14B illustrates an IC card which is an example of an application device using a thin-film-type secondary battery of the present invention. The thin-film-type secondary battery 3001 can be charged with electric power obtained by power feeding from a radio wave 3005. In an IC card, an antenna, an IC 3004, and the thin-film-type secondary battery 3001 are provided. An ID 3002 and a photograph 3003 of a worker who wears the management badge are attached on the IC card 3000. A signal such as an authentication signal can be transmitted from the antenna using the electric power charged in the thin-film-type secondary battery 3001.

An active matrix display device may be provided instead of the photograph 3003. As examples of the active matrix display device, a reflective liquid crystal display device, an organic EL display device, electronic paper, or the like can be given. An image (a moving image or a still image) or time can be displayed on the active matrix display device. Electric power for the active matrix display device can be supplied from the thin-film-type secondary battery 3001.

A plastic substrate is used for the IC card, and thus an organic EL display device using a flexible substrate is preferable.

A solar cell may be provided instead of the photograph 3003. By irradiation with external light, light can be absorbed to generate electric power, and the thin-film-type secondary battery 3001 can be charged with the electric power.

Without limitation to the IC card, the thin-film-type secondary battery can be used for a power source of an in-vehicle wireless sensor, a secondary battery for a MEMS device, or the like.

Figure 15A:
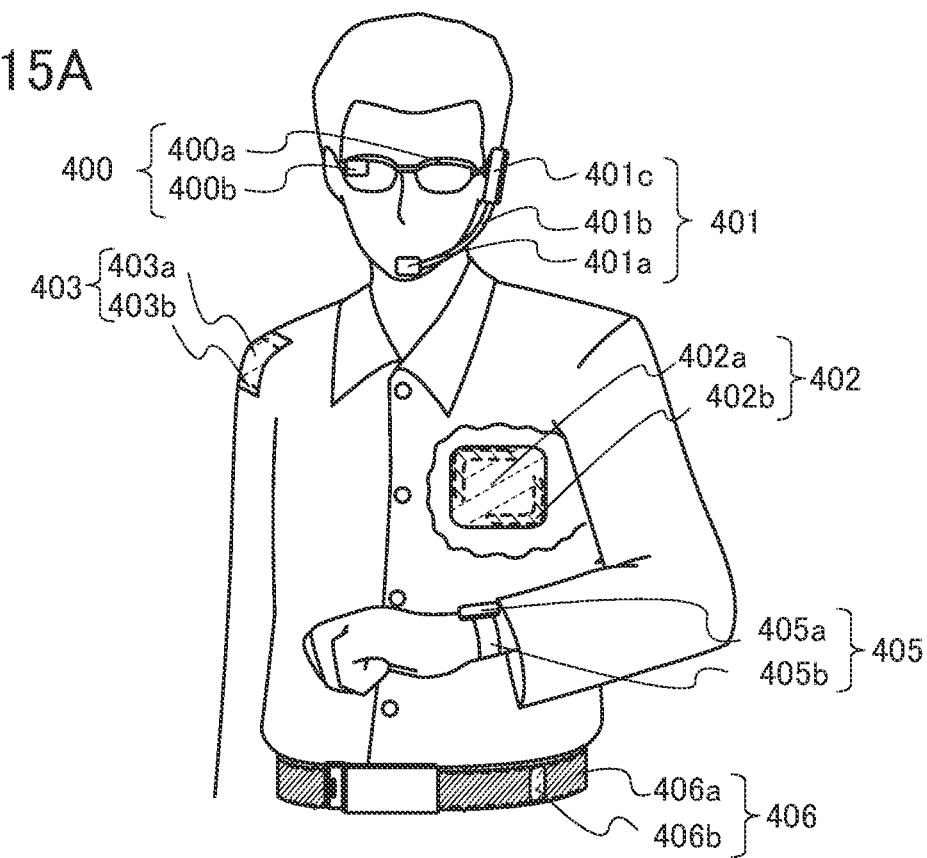
FIG. 15A to FIG. 15C are diagrams illustrating examples of electronic devices.

FIG. 15A illustrates examples of wearable devices. A secondary battery is used as a power source of a wearable device. To have improved water resistance in daily use or outdoor use by a user, a wearable device is desirably capable of being charged wirelessly as well as being charged with a wire whose connector portion for connection is exposed.

For example, the secondary battery can be incorporated in a glasses-type device 400 as illustrated in FIG. 15A. The glasses-type device 400 includes a frame 400a and a display portion 400b. A secondary battery is incorporated in a temple of the frame 400a having a curved shape, whereby the glasses-type device 400 can be lightweight, have a well-balanced weight, and be used continuously for a long time. The solid-state secondary battery described in Embodiment 1 may be included, and thus a structure that can support space saving due to a reduction in the size of a housing can be achieved.

Furthermore, the secondary battery can be incorporated in a headset-type device 401. The headset-type device 401 includes at least a microphone portion 401a, a flexible pipe 401b, and an earphone portion 401c. The secondary battery can be provided in the flexible pipe 401b or the earphone portion 401c. The solid-state secondary battery described in Embodiment 1 may be included, and thus a structure that can support space saving due to a reduction in the size of a housing can be achieved.

The secondary battery can also be incorporated in a device 402 that can be directly attached to a human body. A secondary battery 402b can be provided in a thin housing 402a of the device 402. The solid-state secondary battery described in Embodiment 1 may be included, and thus a structure that can support space saving due to a reduction in the size of a housing can be achieved.

The secondary battery can also be incorporated in a device 403 that can be attached to clothing. A secondary battery 403b can be provided in a thin housing 403a of the device 403. The solid-state secondary battery described in Embodiment 1 may be included, and thus a structure that can support space saving due to a reduction in the size of a housing can be achieved.

Furthermore, the secondary battery can be incorporated in a belt-type device 406. The belt-type device 406 includes a belt portion 406a and a wireless power feeding and receiving portion 406b, and the secondary battery can be incorporated in the belt portion 406a. The solid-state secondary battery described in Embodiment 1 may be included, and thus a structure that can support space saving due to a reduction in the size of a housing can be achieved.

The secondary battery can also be incorporated in a watch-type device 405. The watch-type device 405 includes a display portion 405a and a belt portion 405b, and the secondary battery can be provided in the display portion 405a or the belt portion 405b. The solid-state secondary battery described in Embodiment 4 may be included, and thus a structure that can support space saving due to a reduction in the size of a housing can be achieved.

The display portion 405a can display various kinds of information such as reception information of an e-mail or an incoming call in addition to time.

Since the watch-type device 405 is a type of wearable device that is directly wrapped around an arm, a sensor that measures pulse, blood pressure, or the like of a user can be incorporated therein. Data on the exercise quantity and health of the user can be stored and used for health maintenance.

Figure 15B:
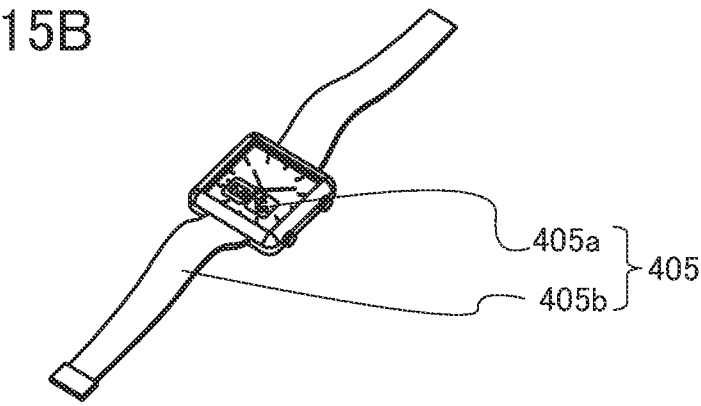

FIG. 15B shows a perspective view of the watch-type device 405 that is detached from an arm.

Figure 15C:
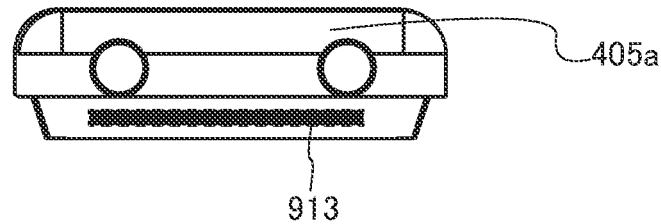

FIG. 15C shows a side view. FIG. 15C shows a state where the secondary battery 913 is incorporated in the watch-type device 405. The secondary battery 913 is the secondary battery described in Embodiment 4. The secondary battery 913, which is small and lightweight, is provided at a position overlapping with the display portion 405a.

Example 1

The concentrations of silicon, nitrogen, carbon, and oxygen in an inner portion or a surface portion of the solid electrolyte layer 202 in the solid-state secondary battery of one embodiment of the present invention can be analyzed quantitatively by the EDX surface analysis (e.g., element mapping). In this example, an analysis example of the solid electrolyte layer 202 will be described.

The solid electrolyte layer 202 was deposited and subjected to EDX measurement. For the EDX measurement, an apparatus in which an EDX unit EX-350X-MaX80 produced by HORIBA, Ltd. was provided in SEM, SU8030 produced by Hitachi High-Technologies Corporation. As the solid electrolyte layer 202, SiO produced by OSAKA Titanium technologies Co., Ltd. was deposited over a titanium sheet to a thickness of 500 nm by a vacuum evaporation method.

An EDX spectrum of a cross section of the solid electrolyte layer 202 is described. In the EDX measurement, measurement points are subjected to electron beam irradiation and the energy of characteristic X-ray generated by the irradiation and its frequency are measured, whereby the EDX spectra are obtained. Table 1 shows the atomic number concentration (%).

TABLE 1

| Element | Atomic number concentration (%) |
| --- | --- |
| C | 7.16 |
| Se | 0.36 |
| O | 52.7 |
| Si | 39.79 |

<Fabrication of Battery Cell>

Next, a CR2032 (diameter: 20 mm, height: 3.2 mm) coin-type battery cell was fabricated to examine charge and discharge characteristics of the above-obtained solid electrolyte layer 202.

A lithium metal was used for a counter electrode. A separator to be described later was sandwiched between the lithium and the solid electrolyte layer 202. Note that the solid electrolyte layer 202 was deposited to a thickness of 500 nm over a titanium sheet as described above.

As an electrolyte contained in the electrolyte solution, 1 mol/L of lithium hexafluorophosphate ($LiPF_6$) was used. As the electrolyte solution, an electrolyte solution in which ethylene carbonate (EC) and diethyl carbonate (DEC) were mixed at EC:DEC=3:7 (volume ratio) was used. Note that in the secondary battery whose charge and discharge characteristics were measured, 10 wt % of FEC (fluoroethylene carbonate) was added to the electrolyte solution.

As a separator, 25-μm-thick polypropylene was used.

A positive electrode can and a negative electrode can that were formed using stainless steel (SUS) were used.

<Measurement of Charge and Discharge Characteristics>

Figure 16:
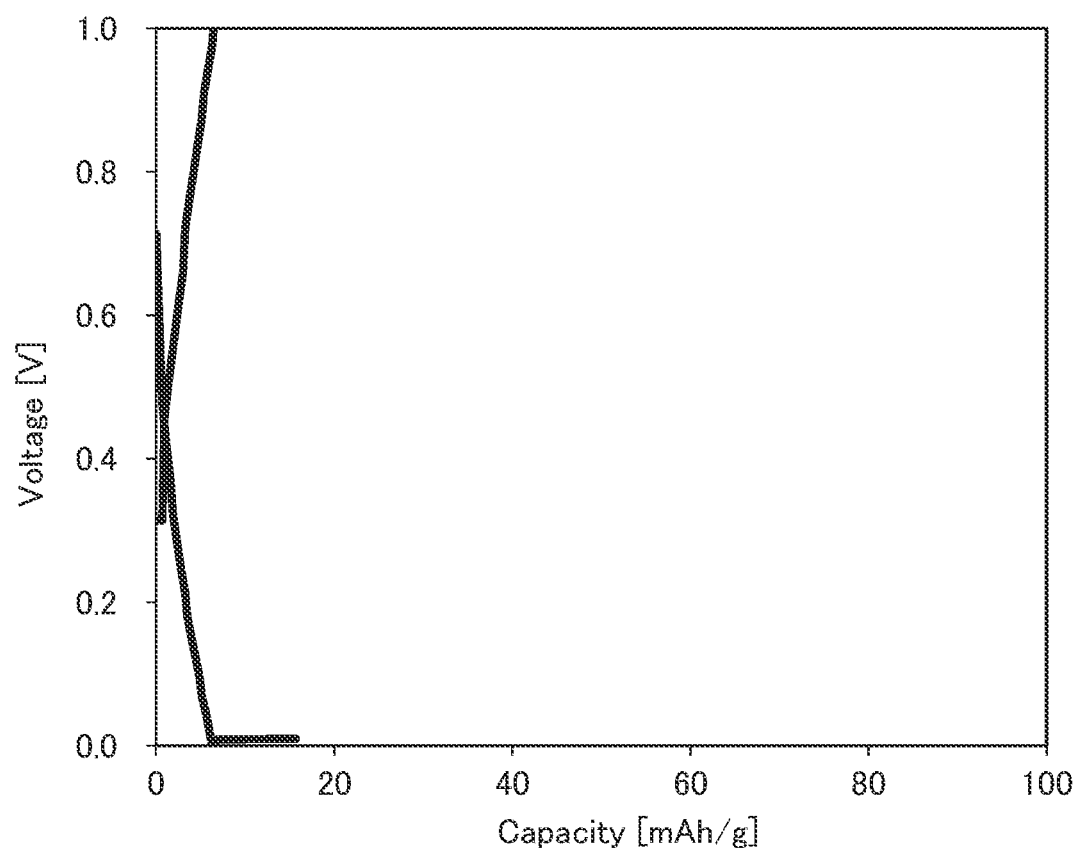
FIG. 16 is a graph showing charge and discharge characteristics of a solid electrolyte layer of Example.

The measurement conditions of the test cells are described. As the charging and discharging method, constant current-constant voltage charging and constant current discharging were performed at a rate of 0.1 C only in the first charging and discharging, and constant current-constant voltage charging and constant current discharging were performed at a rate of 0.2 C in the second and subsequent charging and discharging. Note that the upper limit voltage and the lower limit voltage in charging and discharging were 1.0 V and 0.01 V, respectively, termination current for the constant voltage charging was 0.01 C, and the measurement temperature was 25° C. The rate of the active material containing silicon was calculated in each cell with 4190 mAh/g per carried amount as a reference. FIG. 16 shows the measurement result of the second cycle.

FIG. 16 shows that the solid electrolyte layer 202 has low charge and discharge characteristics. That is, the solid electrolyte layer 202 has lithium ion conductivity and is less likely to accumulate lithium ions. Therefore, the solid electrolyte layer 202 can be effectively used as an electrolyte.

REFERENCE NUMERALS

101: substrate, 150: single-layer cell, 201: positive electrode current collector layer, 202: solid electrolyte layer, 203: negative electrode current collector layer, 204: positive electrode active material layer, 205: negative electrode active material layer, 206: protection layer, 300: transistor, 311: substrate, 313: semiconductor region, 314a: low-resistance region, 314b: low-resistance region, 315: insulator, 316: conductor, 320: insulator, 322: insulator, 324: insulator, 326: insulator, 328: conductor, 330: conductor, 350: insulator, 352: insulator, 354: insulator, 356: conductor, 360: insulator, 362: insulator, 364: insulator, 366: conductor, 370: insulator, 372: insulator, 374: insulator, 376: conductor, 380: insulator, 382: insulator, 384: insulator, 386: conductor, 400: glasses-type device, 400a: frame, 400b: display portion, 401: headset-type device, 401a: microphone portion, 401b: flexible pipe, 401c: earphone portion, 402: device, 402a: housing, 402b: secondary battery, 403: device, 403a: housing, 403b: secondary battery, 405: watch-type device, 405a: display portion, 405b: belt portion, 406: belt-type device, 406a: belt portion, 406b: wireless power feeding and receiving portion, 500: transistor, 503: conductor, 503a: conductor, 503b: conductor, 510: insulator, 511: negative electrode lead electrode, 512: insulator, 513: positive electrode lead electrode, 514: insulator, 516: insulator, 518: conductor, 520: insulator, 522: insulator, 524: insulator, 530: oxide, 530a: oxide, 530b: oxide, 530c: oxide, 540a: conductor, 540b: conductor, 542: conductor, 542a: conductor, 542b: conductor, 543a: region, 543b: region, 544: insulator, 546: conductor, 548: conductor, 550: insulator, 560: conductor, 560a: conductor, 560b: conductor, 574: insulator, 580: insulator, 581: insulator, 582: insulator, 586: insulator, 600: capacitance, 610: conductor, 612: conductor, 620: conductor, 630: insulator, 640: insulator, 845: substrate holding portion, 847: exhaust mechanism, 848: exhaust mechanism, 849: exhaust mechanism, 850: substrate, 851: stage, 852: substrate transfer mechanism, 853: substrate transfer mechanism, 854: substrate transfer mechanism, 855: evaporation material, 856: evaporation source, 857: heater, 858: evaporation boat, 861: arm, 862: arm, 863: imaging unit, 865: rotation mechanism, 867: film thickness measurement mechanism, 868: shutter, 869: evaporation source shutter, 870: load lock chamber, 871: transfer chamber, 872: transfer chamber, 873: transfer chamber, 874: deposition chamber, 880: gate, 881: gate, 882: gate, 883: gate, 884: gate, 885: gate, 886: gate, 887: gate, 888: gate, 891: mask alignment chamber, 892: deposition chamber, 893: heating chamber, 894: material supply chamber, 895: material supply chamber, 896: material supply chamber, 900: substrate, 911: terminal, 912: circuit, 913: secondary battery, 914: antenna, 916: layer, 951: terminal, 952: terminal, 971: terminal, 972: terminal, 3000: IC card, 3001: thin-film-type secondary battery, 3002: ID, 3003: photograph, 3004: IC, 3005: radio wave

The invention claimed is:
1. A solid-state secondary battery comprising:
a first film that has a function of releasing and accumulating a lithium ion;
a second film that has a function of transporting a lithium ion and is over the first film; and
a third film that has a function of releasing and accumulating a lithium ion and is over the second film,
wherein the first film expands and the third film contracts while a total thickness of the first to third films is maintained in a charge period,
wherein the second film comprises silicon and oxygen,
wherein an atomic ratio between silicon and oxygen (O/Si) in the second film is higher than 0 and lower than 2, and
wherein the oxygen is contained in a largest atomic concentration in the second film and silicon is contained in a second largest atomic concentration in the second film.

2. The solid-state secondary battery according to claim 1, wherein the first film comprises silicon and oxygen, and
wherein a mixture ratio of oxygen to silicon in the first film is lower than a mixture ratio of oxygen to silicon in the second film.

3. The solid-state secondary battery according to claim 1, wherein a density of the second film is lower than a density of the first film and a density of the third film.

4. A solid-state secondary battery comprising:
a first film that has a function of releasing and accumulating a lithium ion and is over a negative electrode current collector layer;
a second film that has a function of transporting a lithium ion and is over the first film;
a third film that has a function of releasing and accumulating a lithium ion and is over the second film; and
a positive electrode current collector layer over the third film,
wherein a total thickness of the first to third films is the same before and after charging,
wherein the second film comprises silicon and oxygen,
wherein an atomic ratio between silicon and oxygen (O/Si) in the second film is higher than 0 and lower than 2, and
wherein the oxygen is contained in a largest atomic concentration in the second film and silicon is contained in a second largest atomic concentration in the second film.

5. The solid-state secondary battery according to claim 4, wherein the first film contracts and the third film expands.

6. The solid-state secondary battery according to claim 4, wherein the first film comprises silicon and oxygen, and
wherein a mixture ratio of oxygen to silicon in the first film is lower than a mixture ratio of oxygen to silicon in the second film.

7. The solid-state secondary battery according to claim 4, wherein a density of the second film is lower than a density of the first film and a density of the third film.

8. A solid-state secondary battery comprising:
a first film that has a function of releasing and accumulating a lithium ion and is over a negative electrode current collector layer;
a second film that has a function of transporting a lithium ion and is over the first film;
a third film that has a function of releasing and accumulating a lithium ion and is over the second film; and
a positive electrode current collector layer over the third film,
wherein a thickness between the negative electrode current collector layer and the positive electrode current collector layer is the same before and after charging,
wherein the second film comprises silicon and oxygen, wherein an atomic ratio between silicon and oxygen (O/Si) in the second film is higher than 0 and lower than 2, and wherein the oxygen is contained in a largest atomic concentration in the second film and silicon is contained in a second largest atomic concentration in the second film.

9. The solid-state secondary battery according to claim 8, wherein the thickness is an average value of a thickness of a region between the negative electrode current collector layer and the positive electrode current collector layer.

10. The solid-state secondary battery according to claim 8, wherein the first film contracts and the third film expands.

11. The solid-state secondary battery according to claim 8, wherein the first film comprises silicon and oxygen, and wherein a mixture ratio of oxygen to silicon in the first film is lower than a mixture ratio of oxygen to silicon in the second film.

12. The solid-state secondary battery according to claim 8, wherein a density of the second film is lower than a density of the first film and a density of the third film.

13. A solid-state secondary battery comprising:

a first film that has a function of releasing and accumulating a lithium ion and is over a positive electrode current collector layer;

a second film that has a function of transporting a lithium ion and is over the first film;

a third film that has a function of releasing and accumulating a lithium ion and is over the second film; and a negative electrode current collector layer over the third film, wherein each of the second film and the third film comprises silicon and oxygen, wherein a mixture ratio of oxygen to silicon in the third film is lower than a mixture ratio of oxygen to silicon in the second film, wherein a density of the second film is lower than a density of the first film and a density of the third film, wherein due to charging, the first film contracts and the third film expands, wherein an atomic ratio between silicon and oxygen (O/Si) in the second film is higher than 0 and lower than 2, and wherein the oxygen is contained in a largest atomic concentration in the second film and silicon is contained in a second largest atomic concentration in the second film.

* * * * *